Patented July 13, 1965

3,194,832
18-NOR-D-HOMO-STEROIDS
Hans Reimann, Bloomfield, and Eugene P. Oliveto, Glen Ridge, N.J., assignors to Schering Corporation, Bloomfield, N.J., a corporation of New Jersey
No Drawing. Filed Sept. 15, 1961, Ser. No. 138,273
18 Claims. (Cl. 260—488)

This invention relates to novel 18-nor-D-homo-steroids and to methods for their manufacture. In general, this invention relates to 18-nor-D-homo-steroids having at least one unsaturation in at least one of rings A and B and possessing an oxygen function at C–17 and an unsaturation stemming from C–17a, which steroids are valuable as therapeutics per se or as intermediates, and to methods for their manufacture including novel intermediates produced thereby. More specifically, this invention relates to 5-dehydro- and to A-ring unsaturated 17-keto-13(17a)-dehydro-18-nor-D-homo-steroids possessing at C–11 an oxygen function or an unsaturation, and includes the tautomeric forms of the 11-keto derivatives. Thus, encompassed within this invention are 5-dehydro- and A-ring unsaturated 17-keto-18-nor-D-homo-13(17a)-dehydrosteroids having a configuration at carbon atoms 11 and 12 of the group consisting of:

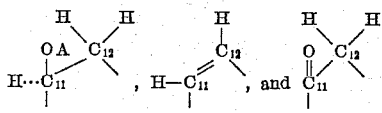

wherein A is hydrogen or an acyl radical; and any tautomeric equivalents of the novel 17-keto-18-nor-D-homo-13(17a)-dehydro-steroids containing the 11-keto-12-unsubstituted configuration.

Included among the compounds of our invention are 18-nor-D-homo-steroids of Formulae I, II, and III as well as the 19-nor-, $\Delta^1$, $\Delta^6$, $\Delta^{1,6}$, $\Delta^{1}$-4,5-dihydro analogs of Formula I, including the 3-ketal derivatives of the compounds of Formula I and of the aforementioned analogs thereof:

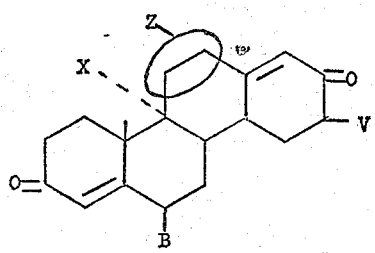

(I)

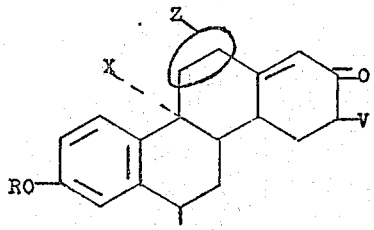

(II)

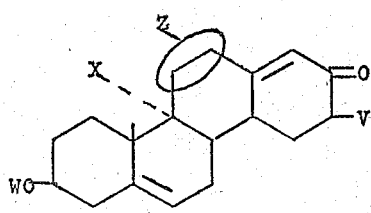

(III)

wherein B is a member of the group consisting of hydrogen, α-lower alkyl, β-lower alkyl, α-halogen and β-halogen; X is a member of the group consisting of hydrogen and halogen; V is a member of the group consisting of H, α-lower alkyl, β-lower alkyl, α-halogen, β-halogen, and α-OY wherein Y is a member of the group consisting of hydrogen and an acid radical of an organic carboxylic acid having up to 8 carbon atoms selected from the group consisting of alkanoic acids and aryl carboxylic acids; R is a member of the group consisting of hydrogen, lower alkyl, and an acid radical of an organic carboxylic acid having up to 8 carbon atoms selected from the group consisting of alkanoic acids and aryl carboxylic acids; W is a member of the group consisting of hydrogen and an acid radical of an organic carboxylic acid having up to 8 carbon atoms selected from the group consisting of alkanoic acids and aryl carboxylic acids; and Z represents a configuration at carbon atoms 11 and 12 of the group consisting of

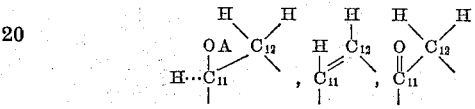

including tautomeric equivalents of the novel 17-keto-18-nor-D-homo-13(17a)-dehydrosteroids containing the 11-keto-12-unsubstituted configuration, wherein A is a member of the group consisting of H and an acid radical of an acid of the group consisting of sulfonic acids and carboxylic acids having up to 12 carbon atoms.

Also included among the novel 17-keto-18-nor-D-homo-13(17a)-dehydrosteroids of our invention are the methyl analogs of Formulae I, II, and III, and particularly the 2- and 7-methyl analogs of the compounds of Formula I.

In this application whenever a compound name does not specifically designate the configuration at 6 and 16, both α and β configurations are included. Thus, the compound name 6,16 - dimethyl-18-nor-D-homo-1,4,13(17a)-androstatriene-11β-ol-3,17-dione encompasses four isomeric configurations, namely 6α,16α - dimethyl - 18 - nor - D-homo-1,4,13(17a)-androstatriene-11β-ol-3,17-dione, 6β,16β - di - methyl - 18-nor-D-homo-1,4,13(17a)-androstatriene-11β-ol - 3,17 - dione, 6α,16β - dimethyl - 18 - nor - D - homo - 1,4,13(17a)-androstatriene-11β-ol-3,17-dione, and 6β,16α-dimethyl-18-nor-D-homo-1,4,13(17a)-androstatriene-11β - ol-3,17-dione.

The term "lower alkyl" includes hydrocarbons having up to 4 carbon atoms such as methyl, ethyl, n-propyl, isopropyl, n-butyl, 2-methylpropyl; and tertiary-butyl.

Typical esters at C–3 and C–16 are lower alkanoates such as acetate, propionate, butyrate and enanthate or aromatic acyl radicals of aryl carboxylic acids having up to 8 carbons atoms such as benzoate and toluate.

Illustrative of the 11β-acyl group which may be present are lower alkanoates such as formate, acetate, propionate, butyrate, isobutyrate, valerate, isovalerate, pivalate, caproate (n-hexanoate), enanthate; sulfonates such as methylsulfonate and p-toluenesulfonate; aromatic acyl radicals of aryl carboxylic acids having up to 8 carbon atoms such as benzoate and toluate, as well as the acyl portions of dibasic acids such as succinate and phthalate.

Novel 18 - nor - D - homo - 13(17a) - dehydrosteroids of Formula I wherein Z is —CH(βOH)—CH₂— are typified by 18-nor-D-homo-androstenes such as: 18-nor - D - homo 4,13(17a) - androstadiene - 11β - ol-3,17-dione and the 1-dehydro analog thereof, 9α-fluoro-18 - nor - D - homo - 4,13(17a) - androstadiene - 11β-ol-3,17-dione and the 1-dehydro analog thereof, 9α-chloro - 18 - nor - D - homo - 4,13(17a) - androstadiene-11β - ol - 3,17 - dione, 9α - bromo - 18 - nor - D - homo-4,13(17a) - androstadiene - 11β - ol - 3,17 - dione, 16(α and β ) - chloro - 18 - nor - D - homo - 4,13(17a)-androstadiene-11β-ol-3,17-dione and the 9α-fluoro- and 9α-chloro-derivatives, thereof, 9α,16β-difluoro-18-nor-D-homo - 4,13(17a) - androstadiene - 11β - ol - 3,17 - dione, 18 - nor - D - homo - 4,6,13(17a) - androstatriene - 11β-ol-3,17-dione, the 1-dehydro and the 9α-fluoro-1-dehydro analogs thereof, 18-nor-D-homo-1,13(17a)-androstadiene - 11β - ol - 3,17 - dione, 6α - methyl - 18 - nor - D-homo - 4,13(17a)-androstadiene - 11β - ol - 3,17 - dione, 6α - 16α - dimethyl - 18 - nor - D - homo - 4,13(17a)-androstadiene-11β-ol-3,17-dione and the 1-dehydro analog and 9α-fluoro-derivative thereof, 6α-fluoro-18-nor-D - homo - 4,13(17a) - androstadiene - 11β - ol - 3,17-dione and the 1-dehydro analog thereof, 2α-methyl-18-nor - D - homo - 4,13(17a) - androstadiene - 11β - ol-3,17 - dione, 9α - fluoro - 16α - acetoxy - 18 - nor - D-homo - 4,13(17a) - androstadiene - 11β - ol - 3,17 - dione, 7α - methyl - 18 - nor - D - homo - 4,13(17a) androstadiene - 11β - ol - 3,17 - dione and 6α - fluoro - 17,19 - bis-nor - D - homo - 4,13(17a) - androstadiene - 11β - ol-3,17-dione.

The 18-nor-D-homo-estrenes of Formula II wherein Z is —CH(βOH)—CH₂ are exemplified by compounds such as 18-nor-D-homo-1,3,5(10),13(17a)-estratetraene-3,11β-diol-17-one and the 3-acetate and 3-benzoate esters thereof, 18-nor-D-homo-1,3,5(10),13(17a)-estratetraene - 3,11β - diol - 17 - one 3 - methylether, 18-nor - D - homo - 1,3,5(10),13(17a) - estratetraene - 3, 11β-diol-17-one 3-ethylether, 16(α and β)-bromo-18-nor-D - homo - 1,3,5(10),13(17a) - estratetraene - 3β,11β-diol-17-one and the 3-ethylether and 3-acetate ester thereof.

Typical 11β-hydroxy steroids of Formula III are 18-nor - D - homo - 5,13(17a) - androstadiene - 3β, 11β-diol-17-one, the 9α-fluoro-derivative thereof and their 3-acetate esters, 16α-bromo-18-nor-D-homo-5,13(17a)-androstadiene-3β,11β-diol-17-one and its 16β-bromo epimer and 18-nor-D-homo-5,13(17a)-androstadiene-3β, 11β,16α-diol-17-one 3,16-diacetate and the 9α-fluoro-9α-bromo- and 9α-chloro- derivatives thereof.

Novel 18-nor-D-homo-13(17a)-dehydrosteroids of Formula I wherein Z is —CH=CH— are 18-nor-D-homo androstenes such as 18-nor-D-homo-4,11,13(17a)-androstatriene-3,17-dione, its 9α-fluoro- derivative and the 1-dehydro analogs thereof, 18-nor-D-homo,4,6,11,13-(17a)-androstatetraene-3,17-dione, and the 1-dehydro analog thereof, 18-nor-D-homo-1,11,13(17a)-androstatriene - 3,17 - dione, 9α - fluoro - 6α,16α - dimethyl - 18-nor - D - homo - 1,4,11,13(17a) - androstatetraene - 3,17-dione, and 9α-fluoro-16α-acetoxy-18-nor-D-homo-4,11,13(17a)-androstatriene-3,17-dione.

Some 11-dehydro-18-nor-D-homo-estrenes of Formula II are 18-nor-D-homo-1,3,5(10),11,13(17a)-estrapentaene-3-ol-17-one and the 3-acetate and 3-benzoate esters thereof, 18-nor-D-homo-1,3,5(10),11,13(17a)-estrapentaene-3-ol-17-one 3-methyl ether, and 16α-bromo-18 - nor - D - homo - 1,3,5(10),11,13(17a) - estrapentaene-3β-ol-17-one and the 16β-bromo epimer thereof.

Exemplary of 11-dehydrosteroids of Formula III are 18 - nor - D - homo - 5,11,13(17a) - androstatriene - 3β-ol-17-one and the 16α-bromo-, 16β-bromo, 16α-chloro- and 16β-chloro derivatives thereof, together with the 3-acetate esters of the foregoing.

Novel 18-nor-D-homo - 13(17a) - dehydrosteroids of Formulae I and III wherein Z is

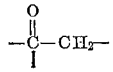

are typified by 11-keto-androstanes such as 18-nor-D-homo-4,13(17a)-androstadiene-3,11,17-trione the 9α-fluoro- derivative thereof and the 1-dehydro analogs of the foregoing, 18-nor-D-homo-4,6,13(17a)-androstatriene - 3,11,17 - trione, 6α - fluoro - 18 - nor - D - homo-1,4,13(17a) androstatriene - 3,11, 17 - trione, 9α,16β-difluoro - 18 - nor - D - homo - 4,13(17a) - androstadiene-3,11,17-trione, and 18-nor-D-homo-5,13(17a)-androstadiene-3β-ol-11,17-dione, the 16α-chloro-, 16β-chloro derivatives thereof and their 3-acetate esters.

Some typical 11-keto-18-nor-D-homo-estrenes of Formula II are such as 18-nor-D-homo-1,3,5(10),13(17a)-estratetraene-3-ol-11,17-dione the 3-acetate and 3-benzoate esters thereof, 18-nor-D-homo-1,3,5(10),13(17a)-estratetraene-3-ol-11,17-dione 3-methyl ether and 18-nor-D - homo - 1,3,5(10),13(17a) - estratetraene - 3,16α-diol-11,17-dione diacetate.

The 11-keto compounds of Formulae I, II, and III may exist in tautomeric forms as shown below (wherein B, R, X, V, and W are as described hereinbefore):

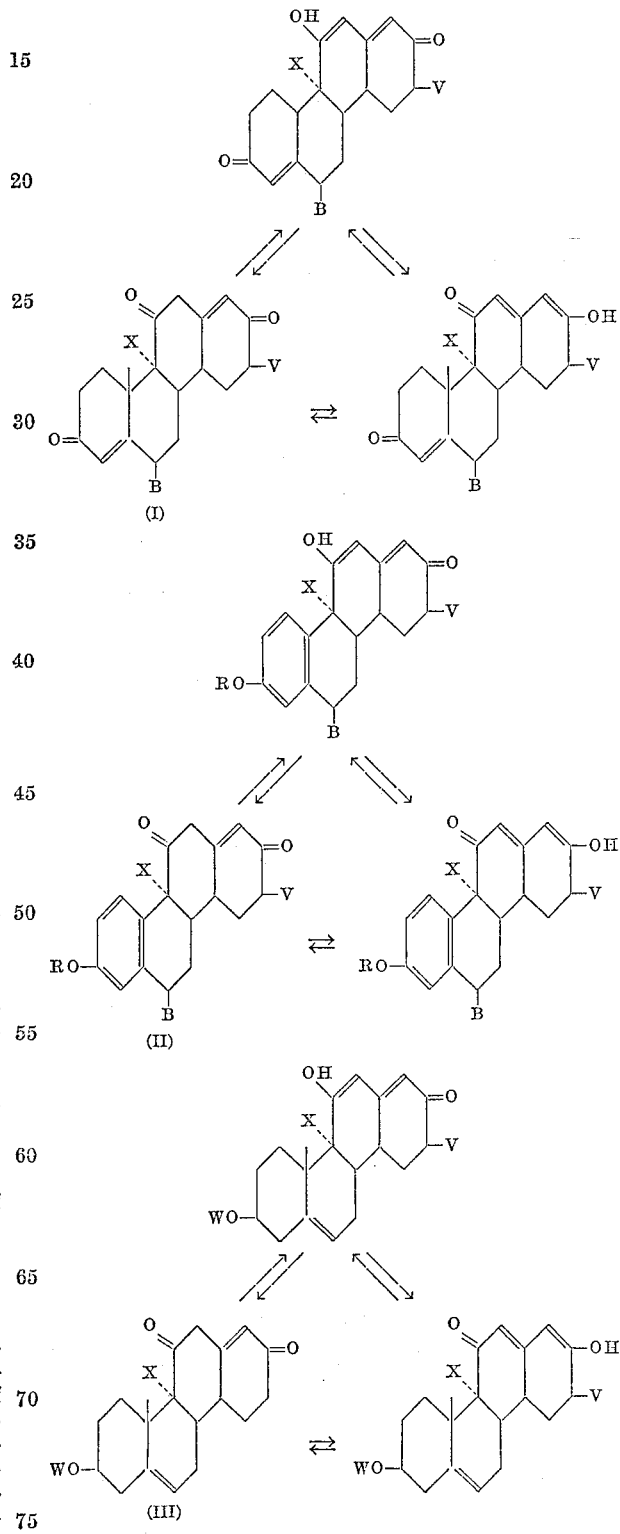

Thus, when naming a novel 17-keto-18-nor-D-homo-13(17a)-dehydrosteroid of this invention possessing an 11-keto group, the tautomeric forms are automatically included, namely the corresponding 11-keto-17-hydroxy-12,17(17a)-bis-dehydro and the corresponding 11-hydroxy - 17 - keto - 11,13(17a) - bis - dehydrosteroids. Therefore, the compound name, 18-nor-D-homo-4,13-(17a)-androstadiene-3,11,17-trione, also includes the structure 18 - nor - D - homo - 4,12,17(17a) - androstatriene-17-ol-3,11-dione and 18-nor-D-homo-4,11,13(17a)-androstatriene-11-ol-3,17-dione.

The 18-nor-D-homo-steroids of our invention are conveniently manufactured by first preparing an 11-nitrite ester of an 11β-hydroxy-17-keto steroid of the estrene or androstene series possessing an unsaturation in the A-ring or at C–5 in the B-ring, and then subjecting the 11β-nitrite-17-keto-androstene or 11β-nitrite-17-keto-estrene to ultraviolet radiation which possesses a band of radiation corresponding to at least some of the absorption bands of the nitrite radical; and isolating the 11β-hydroxy - 17 - keto - 18 - nor - D - homo - 13(17a) - dehydroandrostene or 11β-hydroxy-17-keto-18-nor-D-homo-13(17a)-dehydroestrene thereby produced, i.e., a compound of Formulae I, II, and III wherein Z is

—CH(βOH)—CH₂—

The 11β-acyloxy esters of Formulae I, II, and III i.e., wherein Z is —CH(β-OAcyl)—CH₂— (e.g., the 11-acetate, 11-methanesulfonate, and the 11-benzoate), are then conveniently prepared from the corresponding 11β-hydroxy-18-nor-D-homo-steroids thus produced and isolated, by utilizing conventional techniques such as reaction with an acid anhydride (e.g., acetic anhydride) or an acid halide (e.g., methanesulfonylchloride or benzoylchloride) in pyridine.

The novel 11β-hydroxysteroids of Formulae I, II, and III, prepared and isolated as described hereinabove may be converted to the corresponding 11-keto steroid, i.e., the 11,17-diketo-13(17a)-dehydro derivatives (equivalent to the tautomeric 11-keto-17-hydroxy-12,17(17a)- and the 11-hydroxy-17-keto-11,13(17a) - bis - dehydro forms) by oxidation of the 11-hydroxyl group utilizing known techniques such as chromic acid/sulfuric acid reagent in acetone.

The 11-dehydro-compounds of Formulae I, II, and III (Z is —CH=CH—) are derived from the 11β-hydroxy-18-nor-D-homo-steroids to our invention by dehydration of the 11β-hydroxy function with, for example, perchloric acid in methanol. Novel C-ring saturated and unsubstituted 18-nor-D-homo-steroids may then be derived from the 11-dehydro analogs of Formulae I and II by hydrogenation of the latter, for example using hydrogen at atmospheric pressure with a catalyst such as palladium on calcium carbonate in a solvent such as benzene to selectively reduce the 11,12-double bond, giving the corresponding ring-C saturated and unsubstituted 18-nor-D-homo-13(17a)-androstene-17-ones.

Illustrative of our process is the following reaction sequence. Reaction of 11β-hydroxy-4-androstene-3,17-dione with nitrosyl chloride in pyridine at —30 to —10° C. readily gives 11β-hydroxy-4-androstene-3,17-dione 11-nitrite. The latter is irradiated with a Pyrex filtered 200 watt ultraviolet lamp, in a stream of nitrogen, in toluene at about 40° C. for about one hour. The solution is filtered from some insoluble material, then is concentrated to a residue which is crystallized from acetone to give 11β-hydroxy-18-nor-D-homo-4,13(17a)-androstadiene-3,17-dione (a compound of Formula I wherein Z is —CH(βOH)—CH₂—) which is convertible to the 11β-acetate ester by reaction with a slight molar excess of acetic anhydride in pyridine at room temperature yielding 18-nor-D-homo - 4,13(17a) - androstadiene-11β-ol-3,17-dione 11-acetate (Z is —CH(βOCOCH₃)—CH₂—). Dehydration of the 11β-OH- product, i.e., -11β-hydroxy-18-nor-D-homo - 4,13(17a) - androstadiene-3,17-dione, produced and isolated as described hereinabove, is effected by allowing the compound to stand overnight in methanol containing a small amount of perchloric acid giving 18-nor-D-homo-4,11,13(17a)-androstatriene - 3,17 - dione (Z is —CH=CH—). Oxodation of the 11β-hydroxy-18-nor-D-homo - 4,13(17a) - androstadiene-3,17-dione with chromic acid/sulfuric acid in acetone yields a compound of Formula I, 18-nor-D-homo-4,13(17a)-androstadiene-3,11,17-trione

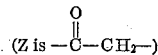

which is tuatomerically equivalent to 18-nor-D-homo-4-12,17(17a)-androstatriene-17-ol-3,11-dione, and 18-nor-D-homo-4,11,13(17a)-androstatriene-11-ol-3,17-dione.

Similarly, 11β-hydroxyestrone 3-acetate and 16α-methyl-5-androstene-3β,11β-diol-17-one 3-acetate are convertible to the corresponding 11-nitrite esters, which, when dissolved in toluene and irradiated with ultraviolet light as described herein yield compounds of Formulae II and III, respectively, having Z equal to —CH(βOH)—CH—, namely, 18-nor-D-homo-1,3,5(10),13(17a)-estratetraene-3,11β-diol-17-one 3-acetate and 16α-methyl-18-nor-D-homo-5,13(17a)-androstadiene-3β,11β-diol-17-one 3-acetate. Dehydration of the aforementioned 11β-hydroxy-18-nor-D-homoestrene and 11β-hydroxy-18-nor-D-homo-5-androstene yields steroids of Formulae II and III wherein Z is —CH=CH—, namely, 18-nor-D-homo-1,3,5(10), 11,13(17a)-estrapentaene-3-ol-17-one 3-acetate and 16α-methyl-18-nor-D-homo - 5,11,13(17a) - androstatriene-3β-ol-17-one 3-acetate respectively. Alternatively, oxidation of the 11β-hydroxyl group yields novel compounds of Formulae II and III wherein Z is

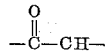

i.e., 18-nor-D-homo-1,3,5(10),13(17a)-estratetraene-3-ol-11,17-dione 3-acetate and 16α-methyl-18-nor-D-homo-5, 13(17a)-androstadiene-3β-ol-11,17-dione 3-acetate respectively (equivalent to the respective tautomeric forms 18-nor-D-homo - 1,3,5(10),12,17(17a) - estrapentaene-3,17-diol-11-one 3-acetate and 18-nor-D-homo-1,3,5(10),11, 13(17a)-estrapentaene-3,11-diol-17-one; and 16α-methyl-18-nor-D-homo - 5,12,17(17a) - androstatriene-3,17-diol-11-one 3β-acetate and 16α-methyl-18-nor-D-homo-5,11, 13(17a)-androstatriene-3,11-diol-17-one 3-acetate.

The necessary intermediates in our novel process are 11-nitrite esters of 11β-hydroxy-17-keto-A-ring unsaturated androstanes, 11β-hydroxy - 17 - keto-5-dehydroandrostanes and 11β-hydroxy estranes including compounds of the following Formulae IV, V, and VI as well as the 19-nor, Δ¹, Δ⁶, Δ¹,⁶, Δ¹-4,5-dihydro analogs of Formula IV including the 3-ketal derivatives of the compounds of Formula IV and analogs thereof:

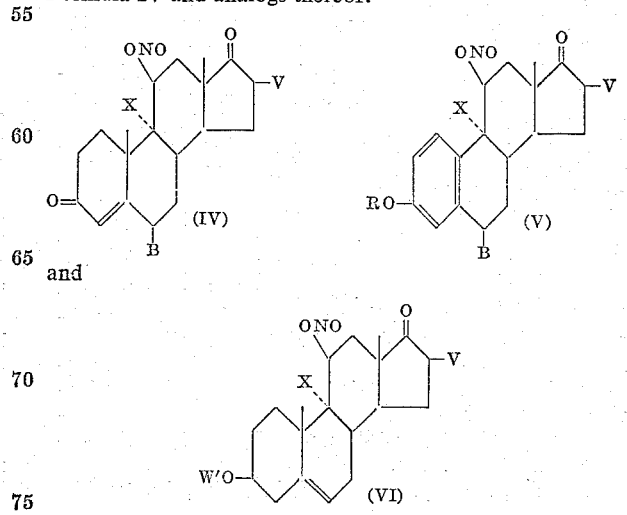

and wherein R, W', B, X, and V are as defined for Formulae I, II, and III. Other 11-nitrite ester intermediates include 1-nitrite esters of methyl analogs of the compounds of Formulae IV, V, and VI.

The 11-nitrite-17-keto-estrane or androstane intermediates of our process are prepared by reacting a solution of the corresponding 11β-hydroxy-17-keto steroid in pyridine, dimethylformamide, ethyl acetate, or other non-polar solvent with a nitrosyl halide, preferably nitrosyl chloride. The nitrosyl chloride or bromide used may be added to the 11β-hydroxysteroid solution in the same solvent as that used to dissolve the 11β-hydroxysteroid, or alternatively, it may be introduced as a gas into the steroidal alcohol solution. The formation of the 11β-nitrite ester is usually rapid and generally complete within ½ hour. Nitrosyl chloride is added until there is a color change to orange-brown or other color which persists, at such time it can be assumed that the 11β-nitrite has formed and the compound in solution is ready for separation and photolysis. The temperature at which the nitrite formation reactions are carried out range form usually —30° to +30° C. In general, when nitrosyl chloride is the reactant used, the reaction temperature is usually in the neighborhood from —20° C. to +10° C., and preferably at —15° C. to —5° C.

After completion of the formation of the 11β-nitrite ester, the nitrite is separated usually by adding water to the solution to precipitate the nitrite and by subsequent filtering followed by crystallization and recrystallization, if desired.

When preparing the 11-nitrite ester intermediates it is preferable to protect any free hydroxyl groups elsewhere in the molecule. Thus, for example, prior to reaction with nitrosyl chloride and subsequent irradiation, the 3-monoesters of 11β-hydroxy-estrone and of 3,11β-dihydroxy-5-androstene-17-one, e.g., the benzoate or acetate, are prepared by standard methods such as reaction of the corresponding 3-hydroxy compound with an acid chloride or acid anhydride, e.g., benzoylchloride and acetic anhydride. Removal of the protective ester grouping is effected preferably after irradiation of the 11-nitrite-17-keto steroid and isolation of the thereby produced novel 11-hydroxy-17-keto-18-nor-D-homo-13(17a)-dehydrosteroid. Hydrolysis may be effected chemically by mild alkaline hydrolysis such as with methanolic sodium carbonate or in the case of the acetate esters, microbiologically utilizing *Flavobacterium dehydrogenans* (Rutgers Collection No. 130) utilizing procedures similar to those described in South African Patent No. 3,462/55.

If an 11-dehydrosteroid of Formula I, II, or III is desired, simultaneous dehydration at C–11 together with hydrolysis of any ester group present may be accomplished with acid hydrolysis or stronger basic hydrolysis such as with perchloric acid or sodium hydroxide respectively. Thus, for example, 11β-hydroxy-estrone (1,3,5(10)-estratriene-3,11β-diol-17-one) upon reaction with one equivalent of acetic anhydride and pyridine is converted to the corresponding 3-acetate ester which upon subsequent reaction with nitrosyl chloride in pyridine as described herein gives 1,3,5(10)-estratriene-3,11β-diol-17-one 3-acetate 11-nitrite. Irradiation with ultraviolet light of a toluene solution of the aforementioned 3-acetate 11-nitrite and isolation of the 18-nor-D-homo-13(17a)-dehydrosteroid thereby formed according to the process of our invention yields 18-nor-D-homo-1,3,5(10),13(17a)-estratetraene-3,11β-diol-17-one 3-acetate which may be subjected to the action of sodium carbonate in aqueous methanol to give 18-nor-D-homo-1,3,5(10),13(17a)-estratetraene-3,11β-diol-17-one. Hydrolysis of the aforementioned 11β-hydroxy-18-nor-D-homo estrene with perchloric acid on the other hand, yields the 3-hydroxy-11-dehydro compound, 18-nor-D-homo-1,3,5(10),11,13(17a)-estrapentaene-3-ol-17-one.

According to the process of this invention, the steroidal nitrite esters of A-ring unsaturated androstanes, 5-dehydroandrostanes, and A-ring unsaturated estranes, after preparation and isolation as described above, are dissolved in a non-reactive solvent prior to being irradiated by ultraviolet light. The solvent chosen preferably has a high degree of transparency to the ultraviolet radiation within the specified band of nitrite absorption. Solvents which may be used for the photolysis of the nitrite include acetic acid, acetone, acetonitrile, benzene, carbon disulfide, carbon tetrachloride, chlorobenzene, chloroform, cyclohexane, dimethylether, dimethylformamide, dioxane, ethyl acetate, Freon 113, heptane, methanol, ethanol, methylene chloride, and toluene. Of these, benzene and toluene yield preferred results.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

The ultraviolet radiation used to activate the nitrite radical is that band of radiant energy which corresponds to some or all of the ultraviolet absorption of the nitrite radical, and is from 3000 A. to 4400 A. This ultraviolet radiation activates the nitrite radical and causes it to leave the oxygen at C–11 with concomitant abstraction of a hydrogen from the 18-carbon by the resulting alkoxy group at C–11; additionally the D-ring splits between C–13 and C–17 then recloses resulting in a bonding between original C–18 and C–17 (new C–17a and 17). This energy is conveniently supplied by a Hanovia high pressure mercury arc lamp with a Pyrex sleeve, while the nitrite to be reacted is contained in an ultraviolet transmitting vessel such as a water cooled Vycor-immersion well.

During the course of the photolysis of an 11β-nitrite ester of an estrane or androstane, a stream of nitrogen or other inert gas is generally bubbled through the solution (although not always necessary) to keep the nitrite solution protected by an inert atmosphere.

Our process whereby a steroidal 17-keto-11β-nitrite estrane or androstane is irradiated by ultraviolet light is usually carried out utilizing a 200 watt mercury lamp as an ultraviolet light source with the irradiated material being dissolved in benzene or toluene and kept under an atmosphere of nitrogen. The reaction is usually carried out at temperatures ranging from 10–50° C. and preferably in the range of 18–40° C.

The photolysis of the nitrite ester which is carried out by irradiation with the selected band of ultraviolet radiation is monitored from time to time by infrared or ultraviolet spectrophotometry of an aliquot, and the reaction is complete when the infrared or ultraviolet absorption spectra lack the characteristic spectra of the nitrite radical.

By our process of photolyzing a 17-keto-11β-nitrite ester of an androstane or estrane, there is obtained a mixture of products, a major portion being a 17-keto-compound of Formula I, II, or III wherein Z is

—CH(βOH)—CH$_2$— separable by filtration, partition chromatographic techniques or by fractional crystallization, or by a combination of these techniques. Our novel compounds are preferably crystallized from organic solvents such as ethyl acetate, acetone, acetone-hexane, methylene chloride, methylene chloride-hexane, methylene chloride-ether and the like, or chromatographed on Florisil using eluting solvents and solvent mixtures such as hexane, ether-hexane, ether, ether-methylene chloride, methylene chloride, methylene chloride-acetone and the like. Alternatively, our novel 18-nor-D-homo-13(17a)-dehydro-androstenes and estrenes may be isolated using a partition chromatographic system on Chromosorb, such as ligroin, propylene glycol, toluene-propylene glycol or the like. When chromatographic techniques are used, fractions are monitored by infrared and ultraviolet spectroscopy to determine the zones containing the desired 11β-hydroxy-18-nor-D-homo-13(17a)-dehydrosteroids.

According to our process, the irradiation of an organic solution of the 11-nitrite ester of an 11-hydroxy-17-keto-A-ring unsaturated or 5-dehydro-estrane or androstane produces an 11β-hydroxy-18-nor-D-homo-13(17a)-dehydroandrostane or estrane of Formulae I, II, and III wherein Z is —CH(βOH)—CH$_2$—. The novel 18-nor-D-homosteroids of our invention having an acyloxy group or a keto group at C–11, or a double bond between the 11- and 12-carbons are derived from the novel 11β-hydroxy-18-nor-D-homo-androstanes and estranes utilizing conventional techniques as heretofore described.

The necessary starting compounds in our process of preparing the novel 18-nor-D-homo-13(17a)-dehydrosteroids of our invention are 11β-hydroxy-17-keto-A-ring unsaturated androstanes, 11β-hydroxy-17-keto-5-dehydroandrostanes, or 11β-hydroxy-17-keto-A-ring unsaturated estranes which are convertible to the corresponding 11-nitrite intermediates of formulae III, IV, and V. Many 11β-hydroxy-17-keto androstane and estrane starting compounds are known; for example, androstanes such as 4-androstene-11β-ol-3,17-dione and the 9α-fluoro- and 9α-chloro- and 9α-bromo-derivatives thereof, 19-nor-4-androstene-11β-ol-3,17-dione, 1,4-androstadiene - 11β - ol-3,17-dione and the 9α-fluoro-derivative thereof, 1,4,6-androstatriene-11β-ol-3,17-dione and its 9α-fluoro-derivative, 6α-methyl - 4 - androstene-11β-ol-3,17-dione, 6α-fluoro-4-androstene-11β-ol-3,17-dione and the 19-nor and 1-dehydro analogs thereof, 6β-fluoro-1,4-androstadiene-11β-ol-3,17-dione, 2α-methyl-4-androstene-11β-ol-3,17-dione, 16α-fluoro-4-androstene-11β-ol-3,17-dione and the 16β-fluoro epimer thereof, 9α,16α-difluoro-4-androstene-11β-ol-3,17-dione and the 16β-fluoro epimer thereof, 9α-chloro-16α-fluoro-4-androstene-11β-ol-3,17-dione and its 16β-fluoro epimer, 9α-fluoro-16β-chloro-4-androstene-11β-ol-3,17-dione, 9α,16β-dichloro - 4 - androstene-11β-ol-3,17-dione and 9α-fluoro-16α-acetoxy-4-androstene-11β-ol-3,17-dione.

Some 11β-hydroxy-17-keto A-ring unsaturated estranes known in the art are 11β-hydroxy-estrone (1,3,5(10)-estratriene-3,11β-diol-17-one) and the 3-acetate and 3-benzoate esters thereof as well as 3-lower alkyl ethers thereof such as the 3-methyl and 3-ethyl ethers, 6α-fluoro-11β-hydroxy-estrone and 1-methyl-11β-hydroxy-estrone 3-methyl ether.

Other 11β-hydroxy-17-keto-androstane starting steroids may be prepared from known 11β,17α,21-trihydroxy-20-keto pregnanes by the oxidative degradation of the C–17 side chain utilizing sodium bismuthate. Thus, 6-dehydrocortisol (4,6-pregnadiene-11β,17α,21-triol-3,20-dione) and 16α-methylprednisolone (16α-methyl - 1,4 - pregnadiene-11β,17α,21-triol-3,20-dione), upon reaction with sodium bismuthate in aqueous acetic acid yield the starting compounds 4,6-androstadiene-11β-ol-3,17-dione, and 16α-methyl-1,4-androstadiene-11β-ol-3,17-dione respectively. Other typical 11β,17,21-trihydroxy-20-keto pregnanes which may be degraded to form the corresponding 11β-hydroxy-17-keto-androstanes are 5α-1-pregnene-11β,17α,21-triol-3,20-dione and the 9α-fluoro-derivative thereof, 7α-methyl-4-pregnene-11β,17α,21-triol-3,20-dione, 9α,16β-difluoro-4-pregnene-11β,17α,21-triol-3,20-dione and the 1-dehydro analog thereof, 9α-bromo-16β-fluoro-4-pregnene-11β,17α,21-triol - 3,20 - dione, 6α,16α-dimethyl-1,4-pregnadiene-11β,17α,21-triol-3,20-dione, 2α-methyl-9α-fluoro-4-pregnene-11β,17α,21-triol-3,20-dione and the 6-dehydro analog thereof.

Alternativley, 11β-hydroxy-17-keto androstanes from which the necessary 11-nitrite ester intermediates are derived, may be conveniently prepared from the corresponding 11-desoxy-17-keto androstanes by hydroxlyating microbiologically at C–11 with the acid of microorganisms such as Curvularia lunata (N.R.R.L. 2380) using procedures analogous to those described in U.S. Patent No. 2,658,023. Thus for example, 16α- and 16β-chloro-4-androstene-3,17-dione may be hydroxylated with *Curvularia lunata* to give respectively 16α-chloro-4-androstene-11β-ol-3,17-dione and 16β-chloro-4-androstene-11β-ol-3,17-dione.

Additionally, 11β-hydroxy-17-keto-estranes and 11β-hydroxy-17-keto-5-dehydro-androstanes may be conveniently prepared from the corresponding 11-desoxy-17-keto-estranes and 11-desoxy-17-keto - 5 - dehydro-androstanes utilizing adrenal perfusion techniques such as described in U.S. Patent No. 2,671,752. An alternative method for preparing an 11-hydroxy-17-keto-estrane is by subjecting the corresponding 11β-hydroxy-17-keto-19-nor-4-androstene to the action of Corynebacterium simplex according to known techniques.

Some typical 11-desoxy-17-keto androstanes and 11-desoxy-17-keto-estranes which may be 11-hydroxylated as described above to give the necessary 11β-hydroxy-17-keto-androstane and 11β-hydroxy-17-keto-estrane precursors of the 11-nitrite intermediates for our process are 5-androstenes such as 5-androstene-3β-ol-17-one, 16α-hydroxy-5-androstene-3β-ol-17-one, 16α-bromo-5-androstene-3β-ol-17-one 3-acetate and the 16β-bromo epimer thereof, 16α-chloro-5-androstene-3β-ol-17-one 3-acetate and its 16β-chloro epimer; 4-androstenes such as 16α-bromo-4-androstene-3,17-dione and the 16β-bromo epimer thereof, 16α-chloro-4-androstene-3,17-dione and its 16β-chloro epimer, and 16β-methyl-19-nor-4-androstene-3,17-dione; as well as estranes such as 16β-methyl-1,3,5(10)-estratriene-3-ol-17-one and the 3-methyl ether derivative thereof, 16α-bromo-1,3,5(10)-estratriene-3-ol-17-one 3-acetate and the 16β-bromo-epimer thereof and 6β-methyl-1,3,5(10)-estratriene-3-ol-17-one and the 6-dehydro analog thereof.

When preparing an 18-nor-D-homo-17-keto-13(17a)-dehydrosteroid of our invention which is substituted at one or more of carbon atoms 2, 4, 6, 9, and 16, for example, such as indicated in Formulae I–VI, it is preferable to have all the desired substituents in the 11-nitrite-17-keto intermediate prior to irradiation with ultraviolet light, although they may be introduced at any time during the process described herein. When starting 11β-hydroxy-17-keto-androstanes or estranes or corresponding 11-desoxy-17-keto-androstanes or estranes or 11β,17α,21-trihydroxy-20-keto-pregnane precursors are not known which have a desired combination of derivatives at one or more of carbons 2, 4, 6, 9, 11, 12, or 16, for example, these groups may be introduced into the molecule utilizing procedures known in the art. Thus, a 6-substituent is introduced into a 3-keto-Δ$^4$-steroid to form a corresponding 6-substituted-3-keto-Δ$^4$-steroid by employing known chemcal techniques. For exemple, an 11β-hydroxy-17-keto-androstane such as 16β-fluoro-4- androstene-11β-ol-3,17-dione is treated with ethylene glycol by known procedures to form the 3,17-bis-ethylene ketal derivative which, in turn, is epoxidized on treatment with a peracid such as peracetic or preferably monoperphthalic acid to give the epoxy derivative, 5α,6α-epoxy-16β-fluoro - 4 - androstene-11β-ol-3,17-dione-3,17-bis-ethylene ketal. From this epoxy intermediate both the 6-methyl and 6-halogeno substituents (e.g., 6-fluoro, 6-chloro, and 6-bromo) may be introduced into the androstane nucleus. Thus, the action of a hydrohalic aid, e.g., hydrofluoric acid, on the epoxy bis-ethylene ketal intermediate simultaneously hydrolyzes the bis-ethylene ketal groups and opens the epoxy ring yielding the corresponding 5α-hydroxy-6β-halogeno intermediate, e.g., 5α-hydroxy-6β,16β-difluoro-4-androstane-3,17-dione; whereas addition of a Grignard reagent such as methyl magnesium iodide with subsequent hydrolysis yields the 5α-hydroxy-6β-methyl compound, e.g., 6β-methyl-16β-fluoro-4-androstene-5α,11β-diol - 3,17 - dione. A reagent such as ethanolic hydrochloric acid on the 5α-hydroxy-6β-substituted-intermediate simultaneously dehydrates the 5α-hydroxy group and epimerizes the 6β-substituent to yield, respectively, 6α,16β-difluoro - 4 - androstene-11β-ol-3,17-dione and 6α-methyl-16β-fluoro-4-androstene-11β-ol-3,17-dione. On the other hand, when 5α-hydroxy-6β-substituted androstane intermediates are treated with, for example, approximately 90 percent acetic acid or with thionyl chloride in a cold basic medium such as pyridine there are obtained 6β-substituted androstanes such as 6β,16β-difluoro-4-androstene-11β-ol-3,17-dione and 6β-methyl - 16β - fluoro-4-androstene-11β-ol-3,17-dione. The 6α-substituted-17-keto androstanes may also be prepared from the corresponding 6β-substituted isomers by means of alcoholic solutions of acids or bases such as ethanolic hydrogen chloride and ethanolic potassium hydroxide.

Introduction of a 9α-halogen group into a 11β-hydroxy-steroid may be effected by dehydrating an 11β-hydroxy-androstene or an 11β-hydroxyestrane such as 16β-methyl-19-nor-4-androstene-11β-ol-3,17-dione and 3-methoxy-16β-methyl-1,3,5(10)-estratriene-11β-ol-17-one (prepared by the action of *Curvularia lunata* on the corresponding 11-desoxy-19-nor-4-androstene and 1,3,5(10)-estratriene respectively) with an alkyl or aryl sulfonyl chloride (e.g., methane sulfonyl chloride) in an alkaline organic medium such as in pyridine to effect the production of the corresponding 9(11)-dehydro-intermediate, e.g., 16β-methyl-19-nor-4,9(11)-androstadiene-3,17-dione and 3-methoxy-16β-methyl-1,3,5(10),9(11)-estratetraene-17-one, respectively. Placement of a halogen, and preferably bromine at this point in the procedure, at the 9α-carbon position is accomplished by conventional means, such as by reacting the 9(11)-dehydrosteroid with hypobromous acid which can be prepared in situ from the reaction of N-bromoacetamide and perchloric acid yielding directly the corresponding 9α-bromo-11β-hydroxy derivative, e.g., 16β-methyl-9α-bromo - 11β - hydroxy-19-nor-4-androstene-3,17-dione and 3-methoxy-16β-methyl - 9α - bromo - 11β - hydroxy-1,3,5(10)-estratriene-17-one, respectively. Other 9α-halogeno derivatives are obtained from 9α-bromo-11β-hydroxy steroids such as the aforementioned, by refluxing the 9α-bromohydrins with mild alkali, such as sodium acetate in methanol, to form the corresponding 9β,11β-oxido derivatives, e.g., 16β-methyl-9β,11β-oxido-19-nor-4-androstene-3,17-dione and 3-methoxy-16β-methyl-9β,11β-oxido-1,3,5(10)-estratriene-17-one respectively. These latter compounds are then reacted with hydrogen fluoride in chloroform with or without ethanol and/or tetrahydrofuran to form fluorhydrins, e.g., 16β-methyl-9α-fluoro-11β-hydroxy - 19 - nor - 4 - androstene-3,17-dione and 3-methoxy-16β-methyl - 9α - fluoro-11β-hydroxy-1,3,5(10)-estratriene-17-one respectively. Similarly, the substitution of anhydrous hydrogen chloride for hydrogen fluoride in this reaction results in the production of the corresponding 9α-chloro-derivatives, 16β-methyl-9α-chloro-11β-hydroxy-19-nor-4-androstene-3,17-dione and 3-methoxy-16β-methyl-9α-chloro - 11β - hydroxy-1,3,5(10)-estratriene-17-one.

Substituents such as α-hydroxy, α and β-lower alkyl, and α and β-halogeno may be introduced into the steroid nucleus at C–16 utilizing known procedures. For example, a hydroxyl group may be introduced microbiologically into the 16α-position of a 16-desoxy-androstane or 16-desoxy-estrane by the action of microorganisms such as *Streptomyces halstedii*, A.T.C.C. 13, 499, or *Streptomyces halstedii*, N.R.R.L. B–1238, utilizing procedures similar to those described in U.S. Patent No. 2,991,230. Thus, 6α - methyl - 4 - androstene-11β-ol-3,17-dione, and 3-methoxy-1,3,5(10)-estratriene-11β-ol-17-one upon reaction with *Streptomyces halstedii*, A.T.C.C. 13, 499 are each converted to their corresponding 16α-hydroxy derivatives, i.e., 6α-methyl-4-androstene-11β,16α-diol-3,17-dione and 3-methoxy-1,3,5(10) - estratriene-11β,16α-diol-17-one respectively. The 16α-hydroxyl group thus introduced into the molecule is preferentially esterified prior to preparing the necessary 11-nitrite intermediate for irradiation with ultraviolet light according to the process described herein. Accordingly, the 11β,16β-dihydroxy intermediates prepared as described above are preferentially first esterified with one equivalent of acetic anhydride in pyridine, for example, to yield their respective 11β-hydroxy-16α-acetoxy derivatives, i.e., 6α-methyl-4-androstene-11β,16α-diol-17-one 16-acetate and 3-methoxy-1,3,5(10)-estratriene-11β,16α-triol-17-one 16-acetate. Conversion to the corresponding 11-nitrite esters followed by irradiation with ultraviolet light in the manner of the process of this application yields compounds of our invention, namely, 6α-methyl - 16α - acetoxy-18-nor-D-homo-4,13(17a)-androstadiene-11β-ol-17-one and 3-methoxy-16α-acetoxy-18-nor-D-homo-1,3,5(10),13(17a) - estratetraene-11β-ol-17-one respectively. Mild hydrolysis such as with potassium bicarbonate in methanol then converts with 16α-acyloxy group to the corresponding 16α-hydroxy derivative, 6α-methyl-18-nor - D - homo-4,13(17a)-androstadiene-11β,16α-diol - 17 - one and 3-methoxy-18-nor-D-homo-1,3,5(10),13(17a) - estratetraene-11β-16α-diol-17-one respectively.

Introduction of a halogen into the 16-position may be effected by any of several known techniques. For example, 16α-hydroxyandrostanes or estranes such as 6α-methyl - 4 - androstene-11β,16α-diol-3,17-dione and 3-methoxy - 1,3,5(10) - estratriene-11β,16α-diol-17-one are convertible to their respective 16-mesylate esters upon reaction with methanesulfonyl chloride in pyridine which, in turn, may be reacted with a halide salt such as potassium fluoride in a manner similar to that described in Patents Nos. 2,857,403 and 2,901,494 to obtain both 16α- and 16β-fluoro-derivatives, e.g., 6α-methyl-16-fluoro-4-androstene-11β-ol-3,17-dione and 3-methoxy-16-fluoro-1,3,5(10)-estratriene-11β-ol-17-one. Similarly, reaction of 16α-mesyloxyandrostanes or 16α-mesyloxyestranes with other halide salts such as calcium chloride, lithium bromide, or sodium iodide yields the corresponding 16β-chloro-, 16β-bromo-, or 16β-iodo-derivatives respectively. Alternatively, enol esters of 17-keto-androstanes or estranes, i.e., 17-acyloxy-16-dehydroandrostanes or estranes may be reacted with bromine in methylene chloride, for example, or with chlorine in acetic acid according to known techniques to obtain the corresponding 16α-bromo and 16α-chloroandrostane or estrane derivatives.

The 16α-lower alkyl and 16β-lower alkyl-11β-hydroxy-17-ketoandrostane derivatives are conveniently obtained via the sodium bismuthate oxidative degradation of the 17-side chain of the corresponding 16-alkyl-17α-hydroxy-pregnanes according to procedures described in copending application of Rausser et al., Serial No. 776,466, filed November 26, 1958. The 16α- and 16β-lower alkyl-estranes may then be derived from the corresponding 3-keto-16-alkyl-1,4-androstadienes by pyrolysis in mineral oil by known techniques. For example; 16α-methyl-prednisolone reacted with sodium bismuthate in acetic acid yields 16α-methyl-1,4-androstadiene-11β-ol-17-one which upon pyrolysis in mineral oil at about 600° C. yields the corresponding 16-alkyl-estrane, 16α-methyl-1,3,5(10)-estratriene-3,11β-diol-17-one.

In preparing the 1-dehydro analogs of the novel compounds of our invention falling under Formula I, the Δ$^1$-bond may be introduced at various stages during the synthesis of the compounds, and preferably at the earlier stages prior to irradiation with ultraviolet light. The dehydrogenation may be accomplished by known chemical means such as by utilizing selenium dioxide or dichlorodicyanobenzoquinone or microbiologically with an organism such as *Corynebacterium simplex* (A.T.C.C. 6946). For example, 6α,9α-difluoro-4-androstene-11β,16α-diol-3,17-dione (prepared by oxidative degradation utilizing sodium bismuthate, of 6α,9α-difluoro-4-pregnene-11β,16α,17α,21-triol-3,20-dione) and 2α-methyl-4-androstene-11β-ol-3,17-dione may be microbiologically dehydrogenated with an organism such as *Corynebacterium simplex* (A.T.C.C. 6946) in a manner similar to that described in U.S. Patent No. 2,837,464 to yield 6α,9α-difluoro-1,4-androstadiene-11β,16α-diol-3,17-dione and 2-methyl-1,4-androstadiene-11β-ol-3,17-dione respectively.

The Δ$^1$-4,5-dihydro androstene analogs of the compounds of Formula I may be obtained from the corresponding 3-keto-4-androstenes of Formula I; and the conversion from 3-keto-4-androstene to 3-keto-1-androstene must be effected in the early stages of the process of this invention, preferably prior to the preparation of the 11-nitrite ester of the starting 11-hydroxy-17-keto-androstanes. For example, 9α-fluoro-16α-acetoxy-4-androstene-11β-ol-3,17-dione subjected to the action of a catalyst such as palladium in a solvent such as ethanol, ethyl acetate or tetrahydrofuran yields 9α-fluoro-16α-acetoxyandrostane-11β-ol-3,17-dione. Reaction of the aforementioned androstane with one equivalent of a halogen such as bromine yelds the 2-bromo-analog which is dehydro halogenated with a reagent such as collidine or dimethylformamide in the presence of calcium carbonate yielding 9α-fluoro-16α-acetoxy-1-androstene-11β-ol-3,17-dione. This starting compound is then convertible to the corresponding 11-nitrite ester which, in turn may be photolyzed by ultraviolet light according to our process to yield a novel compound of our invention, namely, 9α-fluoro-16α-acetoxy-18-nor-D-homo-1,13(17a)-androstadiene-11β-ol-3,17-dione.

A 6-dehydro-bond is preferentially introduced into an 11β-hydroxy-17-keto androstane of Formula IV prior to esterification with nitrosyl chloride and subsequent irradiation with ultraviolet light. The 6-dehydro starting compounds may be prepared directly from the corresponding 3-keto-4-androstene-11β-ol-17-one or 3-keto-1,4-androstadiene-11β-ol-17-one (e.g., 6α-methyl-4-androstene-11β-ol-3,17-dione and 9α-fluoro-16β-chloro-1,4-androstadiene-11β-ol-3,17-dione) by dehydrogenation with an agent such as chloranil in refluxing xylene; or by the allylic halogenation with agents such as N-bromosuccinimide to form the corresponding 3-keto-6-bromo-4-androstene or 1,4-androstadiene (e.g., 6α-methyl-6-bromo-4-androstene-11β-ol-3,17-dione) and subsequent dehydrohalogenation in refluxing collidine or lutidine to give 6 dehydro compounds, e.g., 6α-methyl-4,6-androstadiene-11β-ol-3,17-dione.

A 1,4-dienone of an 11β-hydroxy-17-keto androstane from whence is derived an 11β-nitrite of Formula IV may be converted to an 11β-hydroxy-17-keto-19-nor-4-androstene or an 11β-hydroxy-17-keto-1,3,5(10)-estratriene prior to esterification with a nitrosyl halide and irradiation with ultraviolet light according to our process to obtain the novel 19-nor analogs of Formula I and the 18-nor-D-homo-13(17a)-dehydroestrenes of Formula II. For example, 9α-fluoro-16α-methyl-1,4-androstadiene-11β-ol-3,17-dione (derived by the oxidative degradation with sodium bismuthate of 9α-fluoro-16α-methyl-1,4-pregnadiene-11β,17α,21-triol-3,20-dione) is pyrolyzed either in the solid state or in an inert solvent to effect elimination of the 19-methyl and concomitant aromatization of the A-ring to produce the 11β-hydroxy estrane, 9α-fluoro-16α-methyl-1,3,5(10)-estratriene-3,11β-diol-17-one, which may be reacted with nitrosyl chloride to form an ester of Formula V. Conversion of the aforementioned estratriene to its 3-methyl ether with dimethylsulfate in alkaline methanol, then protection of the 17-ketone by ethylene glycol ketal formation followed by reaction of the resulting 3-methoxy-9α-fluoro-16α-methyl-1,3,5(10)-estratriene-11β-ol-17-one-17-ethylene glycol-ketal with liquid ammonia and lithium in the presence of a proton donor such as ethanol, with subsequent treatment with a reagent such as methanolic hydrochloric acid yields a 19-nor-11β-hydroxy compound, 9α-fluoro-16α-methyl-19-nor-4-androstene-11β-ol-3,17-dione, precursor of an 11-nitrite ester of the 19-nor analog of Formula IV.

Our process whereby an 11β-hydroxy-17-keto steroid such as those of Formulae IV, V, and VI, is irradiated with ultraviolet light and isolated to give 18-nor-D-homo-13(17a)-dehydrosteroids such as those of Formulae I, II, and III, is not limited to the preparation of the compounds defined by Formula I, II, and III. By our process an 11β-hydroxy-17-keto steroid may be converted to the corresponding 11-nitrite ester which, upon irradiation with ultraviolet light, as described hereinabove, is converted to the corresponding 18-nor-D-homo-13(17a)-dehydrosteroid. Thus, for example, 11α-methyl-4-androstene-11β-ol-3,17-dione, 4-chloro-4-androstene-11β-ol-3,17-dione, 2-androstene-11β-ol-17-one, 4-androstene-11β-ol-17-one and the 9α-fluoro analog thereof, 5(10)-androstene-11β-ol-17-one and the 9α-fluoro analog thereof may be converted to their respective 11-nitrite esters which upon irradiation with ultraviolet light yield, respectively, 11α-methyl-18-nor-D-homo-4,13(17a)-androstadiene-11β-ol-3,17-dione, 4-chloro-18-nor-D-homo-4,13(17a)-androstadiene-11β-ol-3,17-dione, 18-nor-D-homo-2,13(17a)-androstadiene-11β-ol-17-one, 18-nor-D-homo-4,13(17a)-androstadiene-11β-ol-17-one and the 9α-fluoro analog thereof, 18-nor-D-homo-5(10),13(17a)-androstadiene-11β-ol-17-one and the 9α-fluoro analog thereof.

The 18-nor-D-homo-13(17a)-dehydroandrostanes of Formulae I and III and the 18-nor-D-homo-13(17a)-dehydroestranes of Formula II are valuable therapeutic agents.

The novel 18-nor-D-homo-13(17a)-dehydro-4-androstenes of Formula I, and the 18-nor,$\Delta^1$,$\Delta^6$,$\Delta^{1,6}$-bis-dehydro and 5α-$\Delta^1$ analogs thereof as well as the novel 18-nor-D-homo-13(17a)-dehydro-5-androstenes of Formula III all are valuable therapeutic agents in that they possess a favorable anabolic/androgenic therapeutic ratio (i.e., they have a very high anabolic to androgenic ratio) and are thus therapeutically valuable for the treatment of disorders requiring high anabolic activity with a minimum of concomitant androgenic effects. Our 18-nor-D-homo-13(17a)-dehydroandrostenes are therefore useful in the treatment of geriatric disorders, debilitating diseases, severe infections, as well as post-surgical therapy. The novel compounds of Formulae I and III are advantageously used in place of anabolic/androgenic agents used in known anabolic/androgenic pharmaceutical preparations such as 17α-ethyl-19-nortestosterone. They are preferably administered orally in the form of tablets, capsules, and the like in dosages ranging from 0.5 mg. to 20 mg. depending on the age of the patient and the severity of the illness.

The 18-nor-D-homo-13(17a)-dehydroestranes of Formula II are useful, therapeutically active compounds in that they exhibit estrogenic activity. Our compounds of Formula II are advantageously used in place of known estrogenic agents such as estradiol, and ethinylestradiol and may be administered in the same manner as these aforementioned estrogens.

The preferred species of the compounds of our invention are those having an 11-hydroxy group at C-11 since in addition to being therapeutically valuable per se, they are valuable as intermediates in preparing the novel 11-keto and 11-dehydro 18-nor-D-homo-compounds of Formulae I, II, and III.

The following are examples which illustrate our invention. It is to be understood that the invention is not to be limited to the exact details of operation or exact compounds shown and described, as obvious modifications and equivalents will be apparent to one skilled in the art; the invention is therefore to be limited only by the scope of the appended claims.

EXAMPLE 1

*18-nor-D-homo-4,13(17a)-androstadiene-11β-ol-3,17-dione*

A. *4-androstene-11β-ol-3,17-dione 11-nitrite.*—To a solution of 1 g. of 4-androstene-11β-ol-3,17-dione in 10 ml. of dry pyridine chilled to —30° C. is added dropwise a chilled saturated solution of nitrosyl chloride in pyridine until the reaction mixture has a definite orange color. During the addition, the reaction solution is allowed to warm to —10° C. and is stirred at this temperature for ½ hour after the addition is complete. The reaction mixture is poured into ice water. A solid separates which is filtered, washed with water and dried to give 4-androstene-11β-ol-3,17-dione 11-nitrite, M.P. 155–160° C., [α]$_D$ (chloroform) +249° λ Nujol 5.76, 5.96, 6.07, 6.18μ.

B. *18 - nor - D - homo - 4,13(17a) - androstadiene-11-ol-3,17-dione.*—A solution of 916 mg. of 4-androstene-11β-ol-3,17-dione 11-nitrite in 200 ml. of toluene under a blanket of nitrogen is irradiated for one hour at 40° C. with a 200 watt mercury lamp provided with a Pyrex filter. The solution is cooled, filtered, and the insoluble residue discarded. The remaining filtrate is evaporated in vacuo to a residue which is recrystallized twice from acetone to give 18-nor-D-homo-4,13(17a)-androstadiene-11β-ol-3,17-dione, M.P. 269–273° C.,

[α]$_D$ (pyridine) +134° λ$_{max.}^{MeOH}$ 241 mμ (ε33,500) λNujol 3, 6, 6.1, 6.2μ.

EXAMPLE 2

*18-nor-D-homo-1,4,13(17a)-androstatriene-11β-ol-3,17-dione*

A. *1,4-androstadiene-11β-ol-3,17-dione 11-nitrite.*—A solution of 6 g. of 1,4-androstadiene-11β-ol-3,17-dione in 60 ml. of dry pyridine is reacted with nitrosyl chloride in pyridine at −30° C. to −10° C. according to the procedure of Example 1A. The resultant product is isolated and purified in the described manner to give 1,4-androstadiene-11β-ol-3,17-dione 11-nitrite, M.P. 105–109° C.,

[α]$_D$ (chloroform) +179° λ$_{max.}^{MeOH}$ 239 mμ (ε16,400) λNujol 5.72, 5.76, 6.0, 6.10, 6.22μ.

B. *18 - nor - D - homo - 1,4,13(17a) - androstatriene-11β-ol-3,17-dione.*—A solution of 700 mg. of 1,4-androstadiene-11β-ol-3,17-dione 11-nitrite in 200 ml. of toluene under a blanket of nitrogen is irradiated with a 200 watt mercury lamp in the manner of Example 1B. The resultant reaction mixture is filtered and the insoluble residue discarded. The filtrate remaining is concentrated to a residue which is recrystallized from acetone to give 18-nor - D - homo - 1,4,13(17a) - androstatriene - 11β - ol-3,17-dione, M.P. 254–257° C.,

[α]$_D$ (pyridine) +35° λ$_{max.}^{MeOH}$ 243 mμ (ε32,600) λNujol 2.97, 6.02, 6.12, 6.18μ.

EXAMPLE 3

*9α - halogeno - 18 - nor - D - homo - 4,13(17a) - androstadiene - 11β - ol - 3,17 - dione and 9α - halogeno - 18-nor - D - homo - 1,4,13(17a) - androstatriene - 11β-ol-3,17-dione*

A. *9α - halogeno - 4 - androstene - 11β - ol - 3,17 - dione 11 nitrite and 9α - halogeno - 1,4-androstadiene - 11β-ol-3,17-dione 11-nitrite.*—A solution of 9α-fluoro-4-androstene-11β-ol-3,17-dione in pyridine is reacted with nitrosyl chloride in pyridine at −30° C. to −10° C. according to the procedure of Example 1A. The resultant product is isolated and purified in the described manner to give 9α-fluoro-4-androstene-11β-ol-3,17-dione 11-nitrite.

In a similar manner, 9α-chloro-4-androstene-11β-ol-3,17-dione. 9α-bromo-4-androstene-11β-ol-3,17-dione and 9α-fluoro-1,4-androstadiene-11β-ol-3,17-dione are reacted with nitrosyl chloride in pyridine to give 9α-chloro-4-androstene-11β-ol-3,17-dione 11-nitrite, 9α-bromo-4-androstene-11β-ol-3,17-dione 11-nitrite, and 9α-fluoro-1,4-androstadiene-11β-ol-3,17-dione 11-nitrite, respectively.

B. *9α - halogeno - 18 - nor - D - homo - 4,13(17a)-androstadiene - 11β - ol - 3,17 - dione and 9α - halogeno-18 - nor - D - homo - 1,4,13(17a) - androstatriene - 11β-ol-3,17-dione.*—A solution of 9α-fluoro-4-androstene-11β-ol-3,17-dione 11-nitrite in toluene under a blanket of nitrogen is irradiated with a 200 watt mercury lamp in the manner of Example 1B. The resultant reaction mixture is filtered and the insoluble residue discarded. The filtrate is concentrated to a residue which is crystallized from acetone-hexane to give 9α-fluoro-18-nor-D-homo-4,13(17)-androstadiene-11β-ol-3,17-dione.

Similarly, 9α-chloro-4-androstene-11β-ol-3,17-dione 11-nitrite, 9α-bromo-4-androstene-11β-ol-3,17-dione 11-nitrite and 9α-fluoro-1,4-androstadiene-11β-ol-3,17-dione 11-nitrite in toluene are irradiated with a 200 watt mercury lamp to give 9α-chloro-18-nor-D-homo-4,13(17a)-androstadiene - 11β- - ol - 3,17 - dione, 9α - bromo - 18-nor - D - homo - 4,13(17a) - androstadiene - 11β - ol - 3,17 - dione and 9α - fluoro - 18 - nor - D - homo - 1,4,13(17a)-androstatriene-11β-ol-3,17-dione, respectively.

EXAMPLE 4

*4,6-androstadiene-11β-ol-3,17-dione*

To a solution of 5 g. of 6-dehydrohydrocortisone (4,6-pregnadiene-11β,17α,21-triol-3,20-dione) in 300 ml. of 50% aqueous acetic acid is added 25 g. of sodium bismuthate. The mixture is stirred for 30 minutes at 90–100° C., then filtered. The filtrate is diluted with water and extracted with methylene chloride. The organic extracts are combined and concentrated to a volume of about 25 ml. The concentrated solution is then filtered through a column of Florisil and eluted with ether. The eluates are combined and concentrated to a residue to give 4,6-androstadiene-11β-ol-3,17-dione.

In a similar manner, 5α-1-pregnene-11β,17α,21-triol-3,20 - dione, 7α-methyl-4-pregnene-11β,17α,21-triol-3,20-dione, and 9α-fluoro-5α-1-pregnene-11β,17α,21-triol-3,20-dione are each reacted with sodium bismuthate in the above-described manner to give respectively 1-androstene-11β-ol-3,17-dione, 7α - methyl - 4-androstene-11β-ol-3,17-dione and 9α-fluoro-1-androstene-11β-ol-3,17-dione.

EXAMPLE 5

*18-nor-D-homo-4,6,13(17a) - androstatriene - 11-ol-3,17-dione, the 1-dehydro and the 9α-fluoro-1-dehydro analogs thereof*

A. In the manner described in Example 1A, 4,6-androstadiene-11β-ol-3,17-dione (prepared as described in Example 4), 1,4,6-androstatriene-11β-ol-3,17-dione and 9α-fluoro-1,4,6-androstatriene-11β-ol-3,17-dione are each reacted with nitrosyl chloride in pyridine and the resultant product isolated to give respectively, 4,6-androstadiene-11β-ol-3,17-dione 11-nitrite, 1,4,6-androstatriene-11β-ol-3,17-dione 11-nitrite and 9α-fluoro-1,4,6-androstatriene-11β-ol-3,17-dione 11-nitrite.

B. In the manner of Example 1B, 4,6-androstadiene-11β-ol-3,17-dione 11-nitrite, 1,4,6-androstatriene-11β-ol-3,17-dione 11-nitrite and 9α-fluoro-1,4,6-androstatriene-11β-ol-3,17-dione 11-nitrite are each irradiated with a 200 watt mercury lamp. The resultant products are isolated as described to give 18-nor-D-homo-4,6,13(17a)-androstatriene - 11β - ol - 3,17 - dione, 18 - nor - D-homo-1,4,6,13(17a)-androstatetraene-11β-ol-3,17-dione and 9α-fluoro-18-nor-D-homo - 1,4,6,13(17a) - androstatetraene-11β-ol-3,17-dione.

EXAMPLE 6

*18-nor-D-homo-1,13(17a)-androstadiene-11β-ol-3,17-dione*

1-Androstene-11β-ol-3,17-dione (prepared as described in Example 4) is reacted with nitrosyl chloride in pyridine in the manner of Example 1A. The resultant product is isolated as described to give 1-androstene-11β-ol-3,17-dione 11-nitrite.

In the manner of Example 1B, a toluene solution of 1-androstene-11β-ol-3,17-dione 11-nitrite is irradiated with a 200 watt mercury lamp. The resultant product is isolated as described to give 18-nor-D-homo-1,13(17a)-androstadiene-11β-ol-3,17-dione.

EXAMPLE 7

*Derivatives of 18-nor-D-homo-4,13(17a)-androstadiene-11β-ol-3,17-dione*

In the manner of Example 1A,
6α-methyl-4-androstene-11β-ol-3,17-dione,
6α-fluoro-4-androstene-11β-ol-3,17-dione,
6β-fluoro-4-androstene-11β-ol-3,17-dione,
6α-fluoro-19-nor-4-androstene-11β-ol-3,17-dione,
6α-fluoro-1,4-androstadiene-11β-ol-3,17-dione,
2α-methyl-4-androstene-11β-ol-3,17-dione,
11α-methyl-4-androstene-11β-ol-3,17-dione,
4-chloro-4-androstene-11β-ol-3,17-dione,
9α-fluoro-16α-acetoxy-4-androstene-11β-ol-3,17-dione, and
7α-methyl-4-androstene-11β-ol-3,17-dione are each reacted with nitrosyl chloride in pyridine. The resultant product is isolated to give, respectively.
6α-methyl-4-androstene-11β-ol-3,17-dione 11-nitrite,
6α-fluoro-4-androstene-11β-ol-3,17-dione 11-nitrite,
6β-fluoro-4-androstene-11β-ol-3,17-dione 11-nitrite,
6α-fluoro-19-nor-4-androstene-11β-ol-3,17-dione 11-nitrite,
6α-fluoro-1,4-androstadiene-11β-ol-3,17-dione 11-nitrite,
2α-methyl-4-androstene-11β-ol-3,17-dione 11-nitrite,
11α-methyl-4-androstene-11β-ol-3,17-dione 11-nitrite,
4-chloro-4-androstene-11β-ol-3,17-dione 11-nitrite,
9α-fluoro-16α-acetoxy-4-androstene-11β-ol-3,17-dione 11-nitrite, and
7α-methyl-4-androstene-11β-ol-3,17-dione 11-nitrite.

In the manner described in Example 1B,
6α-methyl-4-androstene-11β-ol-3,17-dione 11-nitrite,
6α-fluoro-4-androstene-11β-ol-3,17-dione 11-nitrite,
6β-fluoro-4-androstene-11β-ol-3,17-dione 11-nitrite,
6α-fluoro-19-nor-4-androstene-11β-ol-3,17-dione 11-nitrite,
6α-fluoro-1,4-androstadiene-11β-ol-3,17-dione 11-nitrite,
2α-methyl-4-androstene-11β-ol-3,17-dione, 11-nitrite,
11α-methyl-4-androstene-11β-ol-3,17-dione 11-nitrite,
4-chloro-4-androstene-11β-ol-3,17-dione 11-nitrite,
9α-fluoro-16α-acetoxy-4-androstene-11β-ol-3,17-dione 11-nitrite, and
7α-methyl-4-androstene-11β-ol-3,17-dione 11-nitrite
are each irradiated with a 200 watt mercury lamp and the resultant products isolated and purified to give respectively,
6α-methyl-18-nor-D-homo-4,13(17a)-androstadiene-11β-ol-3,17-dione,
6α-fluoro-18-nor-D-homo-4,13(17a)-androstadiene-11β-ol-3,17-dione,
6β-fluoro-18-nor-D-homo-4,13(17a)-androstadiene-11β-ol-3,17-dione,
6α-fluoro-18,19-bis-nor-D-homo-4,13(17a)-androstadiene-11β-ol-3,17-dione,
6α-fluoro-18-nor-D-homo-1,4,13(17a)-androstatriene-11β-ol-3,17-dione,
2α-methyl-18-nor-D-homo-4,13(17a)-androstadiene-11β-ol-3,17-dione,
11α-methyl-18-nor-D-homo-4,13(17a)-androstadiene-11β-ol-3,17-dione,
4-chloro-18-nor-D-homo-4,13(17a)-androstadiene-11β-ol-3,17-dione,
9α-fluoro-16α-acetoxy-18-nor-D-homo-4,13(17a)-androstadiene-11β-ol-3,17-dione, and
7α-methyl-18-nor-D-homo-4,13(17a)-androstadiene-11β-ol-3,17-dione.

EXAMPLE 8

*18-nor-D-homo-1,3,5(10),13(17a) - estratetraene - 3,11β-diol-17-one 3-acylate and the 6α-fluoro derivative thereof*

A. *18-nor-D-homo - 1,3,5(10),13(17a) - estratetraene-3,11β-diol-17-one 3-acetate and the 6α-fluoro derivative thereof.*—A solution of 412 mg. of 11β-hydroxyestrone 3-acetate in 7.5 ml. of pyridine is reacted with nitrosyl chloride according to the procedure of Example 1A. The resultant product is isolated and purified as described to give 11β-hydroxyestrone 3-acetate 11-nitrite, M.P. 168–171° C.

$[\alpha]_D$ (dioxane) +95° $\lambda_{max.}^{MeOH}$ 2.68 mµ (ε1,340) 275 mµ (ε1,200) λNujol 5.65, 5.72, 6.06, 6.20, 6.67, 8.30µ.

A solution of 430 mg. of 11β-hydroxyestrone 3-acetate 11-nitrite in 200 ml. of benzene under a blanket of nitrogen is irradiated for one hour at 18–20° C. with a 200 watt mercury lamp provided with a Pyrex filter. The reaction mixture is filtered and an insoluble residue discarded. The filtrate is evaporated in vacuo to a residue which is chromatographed on Florisil. The column is eluted with ether-hexane mixtures and those fractions eluted with 30–50% ether-in-hexane are combined. The combined fractions are concentrated to a residue which is crystallized from acetone-hexane to give 18-nor-D-homo-1,3,5(10),13(17a)-estratetraene - 3,11β-diol-17-one 3-acetate, M.P. 171–176° C.

$\lambda_{max.}^{MeOH}$ 236 mµ (ε19,100) λNujol 2.95, 5.70, 5.97, 6.15 6.65, 8.05µ.

In a similar manner, 6α-fluoro-1,3,5(10)-estartriene-3,11β-diol-17-one 3-acetate (prepared from the corresponding alcohol by the action of one equivalent of acetic anhydride in pyridine) is reacted with nitrosyl chloride in pyridine to give 6α-fluoro-1,3,5(10)-estratriene-3,11β-diol-17-one 3-acetate 11-nitrite which is irradiated with ultraviolet light to give 6α-fluoro-18-nor-D-homo-1,3,5(10),13(17a)-estratetraene-3,11β-diol-17-one 3-acetate.

B. *18 - nor-D-homo-1,3,5(10),13(17a)-estratetraene-3,11β-diol-17-one 3-benzoate.*—The requisite intermediate, 1,3,5(10)-estratriene-3,11β-diol-17-one 3-benzoate, is prepared as follows:

200 mg. of 11β-hydroxyestrone (1,3,5(10)-estratriene-3,11β-diol-17-one) is dissolved in 3 ml. of pyridine containing 100 mg. of benzoyl chloride. The reaction mixture is left at room temperature for 3 hours then poured into cold dilute hydrochloric acid. The aqueous mixture is stirred for 15 minutes. A solid precipitates which is filtered and crystallized from aqueous methanol to give 1,3,5(10)-estratriene-3,11β-diol-17-one 3-benzoate.

In the manner of Example 1A, 1,3,5(10)-estratriene-3,11β-diol-17-one 3-benzoate is reacted with nitrosyl chloride in pyridine and the resultant product isolated and purified to give 1,3,5(10)-estratriene-3,11β-diol-17-one 3-benzoate 11-nitrite.

In the manner of Example 1B, a toluene solution of 1,3,5(10)-estratriene-3,11β-diol-17-one 3 - benzoate 11-nitrite is irradiated with a 200 watt mercury lamp. The resultant product is isolated as described to give 18-nor-D - homo - 1,3,5(10),13(17a)-estratetraene-3,11β-diol-17-one 3-benzoate.

C. *18 - nor-D-homo-1,3,5(10),13(17a)-estratetraene-3,11β-diol-17-one 3-lower alkanoate.*—To a solution of 100 mg. of 1,3,5(10)-estratriene-3,11β-diol-17-one in 2 ml. of pyridine is added 100 mg. of caprylic anhydride. The reaction mixture is allowed to stand at room temperature for 3 hours then is poured into cold dilute hydrochloric acid and stirred for 15 minutes. A solid separates which is filtered to give 1,3,5(10)-estratriene-3,11β-diol-17-one 3-caprylate.

In a similar manner, 1,3,5(10)-estratriene,3,11β-diol-17-one is reacted with anhydrides of other lower alkanoic acids such as propionic anhydride and valeric anhydride to give the corresponding 3-lower alkanoates, 1,3,5(10)-estratriene-3,11β-diol-17-one 3-propionate and 1,3,5(10)-estratriene-3,11β-diol-17-one 3-valerate.

In the manner described in Example 1A, 1,3,5(10)-estratriene-3,11β-diol-17-one 3-propionate, 1,3,5(10)-estratriene-3,11β-diol-17-one 3-valerate and 1,3,5(10)-estratriene-3,11β-diol-17-one 3-caprylate are each reacted with nitrosyl chloride and pyridine and the resultant product isolated and purified to give respectively, 1,3,5(10)-estratriene - 3,11β-diol-17-one 3-propionate 11-nitrite, 1,3,5(10)-estratriene-3,11β-diol-17-one 3-valerate 11-nitrite and 1,3,5(10) - estratriene - 3,11β-diol-7-one 3-caprylate 11-nitrite.

In the manner described in Example 1B, the 3-alkanoyloxy 11-nitrite estratriene esters prepared above are each irradiated in a toluene solution with a 200 watt mercury lamp. The respective products are isolated as described to give 18-nor-D-homo-1,3,5(10),13(17a)-estratetraene-3,11β-diol-17-one 3-propionate, 18-nor-D-homo-1,3,5(10),13(17a)-estratetraene-3, 11β-diol-17-one 3-valerate, and 18-nor-D-homo-1,3,5(10),13(17a)-estratetraene-3,11β-diol-17-one 3-caproyloate, respectively.

EXAMPLE 9

*18-nor-D-homo-1,3,5(10),13(17a)-estratetraene-3,11β-diol-17-one*

18 - nor - D - homo-1,3,5(10),13(17a)-estratetraene-3, 11β-diol-17-one 3-acetate (the compound of Example 8A) is subjected to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Gm. |
|---|---|
| Yeast extract (Difco) | 10 |
| Potassium phosphate monobasic | 4.48 |
| Sodium phosphate dibasic | 4.68 |
| Tap water, to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 18-nor-D-homo-1,3,5(10),13(17a)-estratetraene-3,11β-diol-17-one 3-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 18 - nor - D-homo-1,3,5(10),13(17a)-estratetraene-3, 11β-diol-17-one.

EXAMPLE 10

*18-nor-D-homo-1,3,5(10),13(17a)-estratetraene-3,11β-diol-17-one 3-lower alkyl ether*

A. *18 - nor-D-homo-1,3,5(10),13(17a)-estratetraene-3, 11β - diol-17-one 3-methylether.*—1,3,5(10)-estratriene-3, 11β-diol-17-one 3-methylether is reacted with nitrosyl chloride in pyridine in the manner of Example 1A. The resultant product is isolated and purified as described to give 1,3,5(10)-estratriene-3,11β-diol-17-one 3-methylether 11-nitrite.

A toluene solution of 1,3,5(10-estratriene-3,11β-diol-17-one 3-methylether 11-nitrite is irradiated with a 200 watt mercury lamp in the manner of Example 1B. The resultant product is isolated and purified as described to give 18 - nor-D-homo-1,3,5(10),13(17a)-estratetraene-3, 11β-diol-17-one 3-methylether.

B. *18 - nor-D-homo-1,3,5(10),13(17a)-estratetraene-3, 11β-diol-17-one 3-ethylether.*—The requisite intermediate, 1,3,5(10) - estratriene-3,11β-diol-17-one 3-ethylether, is prepared in the following manner.

To 1 g. of 1,3,5(10)-estratriene-3,11β-diol-17-one in 30 ml. of 10% ethanolic potassium hydroxide solution is added 3 ml. of diethyl sulfate over a two hour period (0.5 ml. portions every 20 minutes). The reaction mixture is stirred for 90 minutes, then diluted with 150 ml. of water. A solid results which is filtered, washed with water and dried to give 3-ethoxy-1,3,5(10)-estratriene-11β-ol-17-one.

In the manner of Example 1A, 1,3,5(10)-estratriene-3,11β-diol-17-one 3-ethylether is reacted with nitrosyl chloride in pyridine and the resultant product isolated and purified to give 1,3,5(10)-estratriene-3,11β-diol-17-one 3-ethylether 11-nitrite which is then irradiated with a 200 watt mercury lamp in the manner of Example 1B to give 18-nor-D-homo-1,3,5(10),13(17a)-estratetraene-3,11β-diol-17-one 3-ethylether.

EXAMPLE 11

*16-halogeno-18-nor-D-homo - 4,13(17a) - androstadiene-11β-ol-3,17-dione and 9α,16-dihalogeno - 18 - nor-D-homo-4,13(17a)-androstadiene-11β-ol-3,17-dione*

A. *16 - halogeno - 4 - androstene - 11β - ol - 3,17 - dione 11-nitrite and 9α,16-dihalogeno-4-androstene-11β-ol-3,17-dione 11-nitrite.*—A solution of 16β-fluoro-4-androstene-11β-ol-3,17-dione in pyridine is reacted with nitrosyl chloride at —30° C. to —10° C. according to the procedure of Example 1A. The resultant product is isolated and purified in the described manner to give 16β-fluoro-4-androstene-11β-ol-3,17-dione 11-nitrite.

In a similar manner

9α,16β-difluoro-4-androstene-11β-ol-3,17-dione,
9α,16α-difluoro-4-androstene-11β-ol-3,17-dione,
9α-chloro-16β-fluoro-4-androstene-11β-ol-3,17-dione,
9α-chloro-16α-fluoro-4-androstene-11β-ol-3,17-dione,
9α-fluoro-16β-chloro-4-androstene-11β-ol-3,17-dione and
9α,16β-dichloro-4-androstene-11β-ol-3,17-dione are reacted with nitrosyl chloride in pyridine to give, respectively, 9α,16β-difluoro-4-androstene-11β-ol-3,17-dione 11-nitrite,
9α,16α-difluoro-4-androstene-11β-ol-3,7-dione 11-nitrite,
9α-chloro-16β-fluoro-4-androstene-11β-ol-3,17-dione 11-nitrite,
9α-chloro-16α-fluoro-4-androstene-11β-ol-3,17-dione 11-nitrite,
9α-fluoro-16β-chloro-4-androstene-11β-ol-3,17-dione 11-nitrite, and
9α,16β-dichloro-4-androstene-11β-ol-3,17-dione 11-nitrite.

B. *16 - halogeno - 18 - nor - D - homo - 4,13(17a) - androstadiene - 11β - ol - 3,17 - dione and 9α,16 - dihalogeno - 18 - nor - D - homo - 4,13(17a) - androstadiene-11β-ol-3,17-dione.*—A solution of 16β-fluoro-4-androstene-11β-ol-3,17-dione 11-nitrite in toluene, under a blanket of nitrogen, is irradiated with a 200 watt mercury lamp in the manner of Example 1B. The resultant reaction mixture is filtered and the insoluble residue discarded. The filtrate is concentrated to a residue which is crystallized from acetone-hexane to give 16β-fluoro-18-nor-D-homo-4,13(17a)-androstadiene-11β-ol-3,17-dione.

Similarly, following the above procedure, each of the 11-nitrite esters prepared in Example 11A second paragraph is utilized as starting compound in place of 16β-fluoro-4-androstene-11β-ol-3,17-dione 11-nitrite and there is obtained, respectively, 9α,16β-difluoro-18-nor-D-homo-4,13(17a)-androstadiene-11β-ol-3,17-dione,
9α,16α-difluoro-18-nor-D-homo-4,13(17a)-androstadiene-11β-ol-3,17-dione,
9α-chloro-16β-fluoro-18-nor-D-homo-4,13(17a)-androstadiene-11β-ol-3,17-dione,
9α-chloro-16α-fluoro-18-nor-D-homo-4,13(17a)-androstadiene-11β-ol-3,17-dione,
9α-fluoro-16β-chloro-18-nor-D-homo-4,13(17a)-androstadiene-11β-ol-3,17-dione and
9α,16β-dichloro-18-nor-D-homo-4,13(17a)-androstadiene-11β-ol-3,17-dione.

EXAMPLE 12

*9α-fluoro-16α-methyl-18-nor-D-homo-1,4,13(17a)-androstatriene-11β-ol-3,17-dione*

A. *9α - fluoro - 16α - methyl - 1,4 - androstadiene - 11β-ol - 3,17 - dione.*—9α - fluoro - 16α - methyl - 1,4 - pregnadiene-11β,17α,21-triol-3,20-dione is reacted with sodium bismuthate and 50 percent aqueous acetic acid in a manner similar to that described in Example 4. The resultant product is isolated and purified to give 9α-fluoro-16α - methyl - 1,4 - androstadiene - 11β - ol - 3,17 - dione, M.P. 226–233° C. (dec.).

B. *9 - fluoro - 16α - methyl - 1,4 - androstadiene - 11β-ol-3,17-dione 11-nitrite.*—9α-fluoro-16α-methyl-1,4-androstadiene-11β-ol-3,17-dione is reacted with nitrosyl chloride in pyridine according to the procedure of Example 1A and the resultant product isolated and purified to give 9α-fluoro-16α-methyl-1,4-androstadiene-11β-ol-3,17-dione 11-nitrite, melting point 213–217° C.;

$\lambda_{max.}^{MeOH}$ 236 mμ (ϵ15,400); [α]$_D$ +135° (CHCl$_3$); λλNujol 5.76, 6.03, 6.13, 6.22μ

C. *9α - fluoro - 16α - methyl - 18 - nor - D - homo-1,4,13(17a) - androstatriene - 11β - ol - 3,17 - dione.*—9α - fluoro - 16α - methyl - 1,4 - androstadiene - 11β - ol-3,17-dione 11-nitrite dissolved in toluene is irradiated under nitrogen with ultraviolet light according to the procedure of Example 1B. The irradiated solution is cooled, filtered, and the insoluble residue discarded. The remaining filtrate is evaporated in vacuo to a residue which is crystallized from aqueous acetone to give 9α-fluoro-16α - methyl - 18 - nor - D - homo - 1,4,13(17a) - androstatriene-11β-ol-3,17-dione, melting point 265–268° C.;

$\lambda_{max.}^{MeOH}$ 242 mμ (ϵ33,000); [α]$_D$ +102° (pyr); λλNujol 3.09, 6.00, 6.22μ

Similarly, when 16α-methyl-1,4-pregnadiene-11β,17α,21-triol-3,20-dione is reacted according to procedures 12A–C there is obtained 16α-methyl-18-nor-D-homo-1,4,13(17a)-androstatriene 11β-ol-3,17-dione.

EXAMPLE 13

*Preparation of 11β-hydroxy-17-keto-androstanes from the corresponding 11β,17α,21-trihydroxy - 20 - keto-pregnanes*

A. To a solution of 1 gram of 6α,16α-dimethyl-9α-fluoro-1,4-pregnadiene-11β,17α,21-triol-3,20-dione 21-acetate in 40 ml. of methanol is added 1 ml. of 70 percent aqueous perchloric acid. The reaction solution is stirred at room temperature overnight then poured into water, a precipitate separates which is filtered and dried to give 6α,16α - dimethyl - 9α - fluoro - 1,4 - pregnadiene - 11β,-17α,21-triol-3,20-dione.

In a similar manner

6α,16α-dimethyl-4-pregene-11β,17α,21-triol-3,20-dione 21-acetate,
6α,9α-difluoro-16α-methyl-4-pregnene-11β,17α,21-triol-3,20-dione 21-acetate,
6α-fluoro-9α-chloro-16α-methyl-4-pregnene-11β,17α,21-triol-3,20-dione 21-acetate,
6α-fluoro-9α-bromo-16α-methyl-4-pregnene-11β,17α,21-triol-3,20-dione 21-acetate,
2α-methyl-4,6-pregnadiene-11β,17α,21-triol-3,20-dione 21-acetate,
2α-methyl-9α-iodo-4,6-pregnadiene-11β,17α,21-triol-3,20-dione 21-acetate, and
2α-methyl-9α-bromo-4,6-pregnadiene-11β,17α-21-triol-3,20-dione 21-acetate are each reacted with aqueous perchloric acid to yield respectively 6α,16α-dimethyl-4-pregnene-11β,17α,21-triol-3,20-dione,
6α,9α-difluoro-16α-methyl-4-pregnene-11β,17α,21-triol-3,20-dione,
6α-fluoro-9α-chloro-16α-methyl-4-pregnene-11β,17α,21-triol-3,20-dione,
6α-fluoro-9α-bromo-16α-methyl-4-pregnene-11β,17α,21-triol-3,20-dione,
2α-methyl-4,6-pregnadiene-11β,17α,21-triol-3,20-dione,
2α-methyl-9α-iodo-4,6-pregnadiene-11β,17α,21-triol-3,20-dione, and
2α-methyl-9α-bromo-4,6-pregnadiene-11β,17α,21-triol-3,20-dione.

B. A solution of 6α,16α-dimethyl-9α-fluoro-1,4-pregnadiene-11β,17α,21-triol-3,20-dione in 50 percent aqueous acetic acid is reacted with sodium bismuthate in the manner described in Example 4 and the resultant product isolated and purified to give 6α,16α-dimethyl-9α-fluoro-1,4-androstadiene-11β-ol-3,17-dione.

In a similar manner,

6α,16α-dimethyl-4-pregnene-11β,17α,21-triol-3,20-dione,
6α,9α-difluoro-16α-methyl-4-pregnene-11β,17α,21-triol-3,20-dione,
6α-fluoro-9α-chloro-16α-methyl-4-pregnene-11β,17α,21-triol-3,20-dione,
6α-fluoro-9α-bromo-16α-methyl-4-pregnene-11β,17α,21-triol-3,20-dione,
2α-methyl-4,6-pregnadiene-11β,17α,21-triol-3,20-dione,
2α-methyl-9α-iodo-4,6-pregnadiene-11β,17α,21-triol-3,20-dione,
2α-methyl-9α-bromo-4,6-pregnadiene-11β,17α,21-triol-3,20-dione,
9α,16β-difluoro-1,4-pregnadiene-11β,17α,21-triol-3,20-dione,
9α-bromo-11β-fluoro-4-pregnene-11β,17α,21-triol-3,20-dione,
6α,16α-dimethyl-1,4-pregnadiene-11β,17α,21-triol-3,20-dione,
2α-methyl-9α-fluoro-4,6-pregnadiene-11β-17α,21-triol-3,20-dione,
9α-fluoro-5α-1-pregnene-11β,17α,21-triol-3,20-dione,
2α-methyl-9α-fluoro-4-pregnene-11β,17α,21-triol-3,20-dione, and
2α-ethyl-9α-chloro-4,6-pregnadiene-11β,17α,21-triol-3,20-dione, are each reacted with sodium bismuthate in the manner of Example 4 to give respectively, 6α,16α-dimethyl-4-androstene-11β-ol-3,17-dione,
6α,9α-difluoro-16α-methyl-4-androstene-11β-ol-3,17-dione,
6α-fluoro-9α-chloro-16α-methyl-4-androstene-11β-ol-3,17-dione,
6α-fluoro-9α-bromo-16α-methyl-4-androstene-11β-ol-3,17-dione,
2α-methyl-4,6-androstadiene-11β-ol-3,17-dione,
2α-methyl-9α-iodo-4,6-androstadiene-11β-ol-3,17-dione,
2α-methyl-9α-bromo-4,6-androstadiene-11β-ol-3,17-dione,
9α,16β-difluoro-1,4-androstadiene-11β-ol-3,17-dione,
9α-bromo-16β-fluoro-4-androstene-11β-ol-3,17-dione,
6α,16α-dimethyl-1,4-androstadiene-11β-ol-3,17-dione,
2α-methyl-9α-fluoro-4,6-androstadiene-11β-ol-3,17-dione,
9α-fluoro-1-androstene-11β-ol-3,17-dione,
2α-methyl-9α-fluoro-4-androstene-11β-ol-3,17-dione, and
2α-ethyl-9α-chloro-4,6-androstadiene-11β-ol-3,17-dione.

EXAMPLE 14

*6,16 - disubstituted - 18 - nor - D - homo - 4,13(17a)-androstadiene-11β-ol-3,17-diones and 6,16-disubstituted-18 - nor - D - homo - 1,4,13(17a) - androstatriene-11β-ol-3,17-diones*

A. In the manner described in Example 1A 6α,16α-dimethyl - 9α - fluoro - 1,4 - androstadiene - 11β - ol - 3,17-dione is reacted with nitrosyl chloride in pyridine and the resultant product isolated to give 6α,16α - dimethyl - 9α-fluoro-1,4-androstadiene-11β-ol-3,17-dione 11-nitrite.

In the manner of Example 1B, 6α,16α-dimethyl-9α-fluoro-1,4-androstadiene-11β-ol-3,17-dione 11 - nitrite in toluene solution is irradiated with a 200 watt mercury lamp and the resultant product isolated and purified to give 6α,16α - dimethyl - 9α - fluoro - 18 - nor - D - homo-1,4,13(17a)-androstatriene-11β-ol-3,17-dione.

B. In a similar manner

6α,16α-dimethyl-4-androstene-11β-ol-3,17-dione,
6α,9α-difluoro-16α-methyl-4-androstene-11β-ol-3,17-dione,
6α-fluoro-9α-chloro-16α-methyl-4-androstene-11β-ol-3,17-dione,
6α-fluoro-9α-bromo-16α-chloro-4-androstene-11β-ol-3,17-dione, and
6α,16α-dimethyl-1,4-androstadiene-11β-ol-3,17-dione are each reacted with nitrosyl chloride in pyridine to give the respective nitrite esters, 6α,16α-dimethyl-4-androstene-11β-ol-3,17-dione 11-nitrite,
6α,9α-difluoro-16α-methyl-4-androstene-11β-ol-3,17-dione 11-nitrite,
6α-fluoro-9α-chloro-16α-methyl-4-androstene-11β-ol-3,17-dione 11-nitrite,
6α-fluoro-9α-bromo-16α-chloro-4-androstene-11β-ol-3,17-dione 11-nitrite, and
6α,16α-dimethyl-1,4-androstadiene-11β-ol-3,17-dione 11-nitrite.

Irradition of each of the 11-nitrite esters prepared in the paragraph above with a 200 watt mercury lamp according to the procedure of Example 1B yields, respectively, 6α,16α-dimethyl-18-nor-D-homo-4,13(17a)-androstadiene-11β-ol-3,17-dione,
6α,9α-difluoro-16α-methyl-18-nor-D-homo-4,13(17a)-androstadiene-11β-ol-3,17-dione,
6α-fluoro-9α-chloro-16α-methyl-18-nor-D-homo-4,13(17a)-androstadiene-11β-ol-3,17-dione,
6α-fluoro-9α-bromo-16α-methyl-4,13(17a)-androstadiene-11β-ol-3,17-dione and
6α,16α-dimethyl-18-nor-D-homo-1,4,13(17a)-androstatriene-11β-ol-3,17-dione.

EXAMPLE 15

*2 - alkyl - 18 - nor - D - homo - 4,13(17a)-androstadiene-11β-ol-3,17-diones and 2 - alkyl - 18 - nor - D - homo - 4,6,13(17a)-androstatriene-11β-ol-3,17-diones*

A. *2α - methyl - 9α - fluoro - 18 - nor - D - homo - 4,13(17a)-androstadiene-11β-ol-3,17-dione.*—In the manner of Example 1A, 2α-methyl-9α-fluoro-4-androstene-11β-ol-3,17-dione (prepared as described in Example 13) is reacted with nitrosyl chloride in pyridine and the resultant product isolated to give 2α-methyl-9α-fluoro-4-androstene-11β-ol-3,17-dione 11-nitrite.

In a manner similar to that described in Example 1B, 2α - methyl - 9α - fluoro - 4 - androstene - 11β - ol - 3,17-dione 11-nitrite in a toluene solution under nitrogen is irradiated with a 200 watt mercury lamp and the resultant product isolated and purified to give 2α-methyl-9α-fluoro-18 - nor - D - homo - 4,13(17a) - androstadiene-11β-ol-3,17-dione.

B. By following the procedure similar to that described in Example 15A the following compounds prepared as described in Example 13, e.g., 2α-methyl-9α-fluoro-4,6-androstadiene - 11β - ol - 3,17 - dione, 2α - methyl - 4,6-androstadiene - 11β - ol - 3,17 - dione, 2α - methyl - 9α-iodo - 4,6 - androstadiene - 11β - ol - 3,17 - dione, 2α-methyl - 9α - bromo - 4,6 - androstadiene - 11β - ol - 3,17-dione, and 2α-ethyl-9α-chloro-4,6-androstadiene-11β-ol-3,17-dione are each reacted with nitrosyl chloride in pyridine yielding the respective 11-nitrite esters, 2α-methyl - 9α - fluoro - 4,6 - androstadiene - 11β - ol - 3,17-dione 11-nitrite, 2α-methyl-4,6-androstadiene-11β-ol-3,17-dione 11-nitrite, 2α-methyl-9α-iodo-4,6-androstadiene-11β-ol-3,17-dione 11-nitrite, 2α-methyl-9α-bromo-4,6-androstadiene-11β-ol-3,17-dione 11-nitrite and 2α-ethyl-9α-chloro - 4,6 - androstadiene - 11β - ol - 3,17 - dione 11-nitrite. Irradiation of each of these nitrite esters with a 200 watt mercury lamp provided with a Pyrex filter yields respectively, 2α-methyl-9α-fluoro-18-nor-D-homo-4,6,13(17a) - androstatriene - 11β - ol - 3,17 - dione, 2α-methyl - 18 - nor - D - homo - 4,6,13(17a) - androstatriene - 11β - ol - 3,17 - dione, 2α - methyl - 9α - iodo - 18-nor - D - homo - 4,6,13(17a) - androstatriene - 11β - ol-3,17 - dione, 2α - methyl - 9α - bromo - 18 - nor - D-homo - 4,6,13(17a) - androstatriene - 11β - ol - 3,17-dione and 2α-ethyl-9α-chloro-4,6,13(17a)-androstatriene-11β-ol-3,17-dione.

EXAMPLE 16

*9α - halogeno - 16β - fluoro - 18 - nor - D - homo-4,13(17a) - androstadiene - 11β - ol - 3,17 - diones and 9α - halogeno - 16β - fluoro - 18 - nor - D - homo-1,4,13(17a)-androstatriene-11β-ol-3,17-diones*

In the manner of Example 1A, 9α-bromo-16β-fluoro-4-androstene-11β-ol-3,17-dione, and 9α,16β-difluoro-1,4-androstadiene-11β-ol-3,17-dione (prepared as described in Example 13) are each reacted with nitrosyl chloride in pyridine and the resultant product isolated to give respectively 9α-bromo - 16β - fluoro - 4 - androstene - 11β-ol-3,17-dione 11-nitrite and 9α,16β-difluoro-1,4-androstadiene-11β-ol-3,17-dione 11-nitrite.

In the manner of Example 1B, 9α-bromo-16β-fluoro-4-androstene-11β-ol-3,17-dione 11-nitrite and 9α,16β-difluoro - 1,4 - androstadiene - 11β - ol - 3,17 - dione 11-nitrite are each irradiated with a 200 watt mercury lamp through a Pyrex filter to give respectively, 9α-bromo-16β-fluoro - 18 - nor - D - homo - 4,13(17a) - androstadiene-11β-ol-3,17-dione, and 9α,16β-difluoro-18-nor-D-homo-1,4,13(17a)-androstatriene-11β-ol-3,17-dione.

EXAMPLE 17

*9α-fluoro-18-nor-D-homo-5α-1,13(17a)-androstadiene-11β-ol-3,17-dione*

In the manner described in Example 1A, 9α-fluoro-5α-1-androstene-11β-ol-3,17-dione (prepared as described in Example 13B) is reacted with nitrosyl chloride in pyridine and the resultant product isolated to give 9α-fluoro-5α-1-androstene-11β-ol-3,17-dione 11-nitrite.

In the manner described in Example 1B, 9α-fluoro-5α-1-androstene-11β-ol-3,17-dione 11-nitrite is irradiated with a 200 watt mercury lamp and the resultant product isolated and purified to give, 9α-fluoro-18-nor-D-homo-5α-1,13(17a)-androstadiene-11β-ol-3,17-dione.

EXAMPLE 18

*16-halogeno-18-nor-D-homo-4,13(17a)-androstadiene-11β-ol-3,17-dione*

A. *16-halogeno-4-androstene-11β-ol - 3,17 - dione.*—A living culture of the organism *Curvularia lunata* (N.R.R.L. 2380) is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

100 ml. of this medium is placed in each of several 300 ml. flasks. To each flask is added 50 mg. of 16α-bromo-4-androstene-3,17-dione dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 16α-bromo-4-androstene-11β-ol-3,17-dione.

In a similar manner 16β-bromo-4-androstene-3,17-dione, 16α-chloro-4-androstene-3,17-dione, and 16β-chloro-4-androstene-3,17-dione are each subjected to the action of *Curvularia lunata* and each of the resultant products isolated and purified to give, respectively, 16β-bromo-4-androstene - 11β - ol - 3,17 - dione, 16α - chloro - 4-androstene-11β-ol-3,17-dione, and 16β-chloro-4-androstene-11β-ol-3,17-dione.

B. *16 - halogeno - 4 - androstene - 11β - ol - 3,17 - dione 11-nitrite.*—16α - bromo - 4 - androstene - 11β - ol - 3,17-dione and 16β-bromo-4-androstene-11β-ol-3,17-dione, 16α-chloro-4-androstene-11β-ol-3,17-dione, and 16β-chloro-4-androstene-11β-ol-3,17-dione, are each reacted with nitrosyl chloride according to the procedure of Example 1A. Isolation of the resultant products yields, respectively, 16α - bromo - 4 - androstene - 11β - ol - 3,17 - dione 11-nitrite and 16β-bromo-4-androstene-11β-ol-3,17-dione 11-nitrite, 16α-chloro-4-androstene-11β-ol-3,17-dione 11-nitrite and 16β-chloro-4-androstene-11β-ol-3,17-dione 11-nitrite.

C. *16-halogeno-18-nor - D-homo - 4,13(17a) - androstadiene-11β-ol-3,17-dione.*—16α-bromo - 4 - androstene-11β-ol-3,17-dione 11-nitrite and 16β-bromo-4-androstene-11β-ol-3,17-dione 11-nitrite, 16α-chloro-4-androstene-11β-ol-3,17-dione 11-nitrite and 16β-chloro-4-androstene-11β-ol-3,17-dione 11-nitrite are each irradiated with a 200 watt mercury lamp in a toluene solution while under a blanket of nitrogen according to the procedure of Example 1B. The resultant products are isolated and purified to give, respectively, 16α-bromo-18-nor-D-homo - 4,13(17a) - androstadiene-11β-ol-3,17-dione and 16β-bromo-18-nor-D-homo-4,13(17a)-androstadiene-11β-ol - 3,17 - dione, 16α-chloro-18-nor-D-homo-4,13(17a) androstadiene - 11β - ol-3,17-dione, and 16β-chloro-18-nor-D - homo - 4,13(17a)-androstadiene-11β-ol-3,17-dione.

EXAMPLE 19

*5-androstene-3β,11β-diol-17-one*

Fresh hog or beef adrenal glands are passed through a meat grinder, then 250 parts by weight of the ground adrenals are stirred with 750 parts of a solution prepared by mixing together 40 parts of a 4.5 percent solution of sodium chloride plus 1.6 parts of a 5.75 percent solution of potassium chloride plus 0.4 part of a 19.1 solution of magnesium sulphate, plus 20 parts of an 0.1 molar phosphate buffer of pH 7.4 plus 30 parts of an 0.15 molar solution of sodium fumarate or sodium citrate and 110 parts of water. This solution has a pH of about 7.4 and is at a temperature of 37° C. when added to the adrenal tissue. To this mixture is added, with stirring, one part of 5-androstene-3β-ol-17-one dissolved in 30 parts of propylene glycol at 37° C. The final mixture is incubated at 37° C. for 2 hours with vigorous stirring and then is extracted with chloroform. The chloroform extracts are combined and concentrated to a small volume and then placed on a Florisil column, dampened with hexane, and eluted with hexane-ether, ether, and ether-acetone and acetone. The like fractions are combined and concentrated to a residue of substantially 5-androstene-3β,11β-diol-17-one.

In a similar manner 5-androstene-3β-16α-diol-17-one is treated with adrenal tissue and the resultant product isolated to give, 5-androstene-3β,11β,16α-triol-17-one.

Alternatively, the compound of this example is prepared as follows:

A solution of 10 g. of 5-pregnene-3β,17α,21-triol-11,20-dione in 100 ml. of tetrahydrofuran is added dropwise over a 30 minute period to a solution of 400 g. of lithium aluminum hydride in 300 ml. of distilled tetrahydrofuran cooled in an ice bath. When the addition is complete, the stirred reaction mixture is warmed to reflux temperature then refluxed for two hours. The reaction mixture is then cooled and 100 ml. of ethyl acetate added dropwise, followed by 100 ml. of saturated aqueous sodium sulfate. The mixture is filtered and the filtrate dried over magnesium sulfate, concentrated in vacuo to a residue which is triturated with ether and filtered to give 5-pregnene-3β,11β,17α,20,21-pentol.

A solution of 5 grams of 5-pregnene-3β,11β,17α,20,21-pentol in 300 ml. of 50 percent aqueous acetic acid is reacted with 25 g. of sodium bismuthate in the manner of Example 4. The resultant product is isolated and purified in a manner similar to that described to give, 5-androstene-3β,11β-diol-17-one.

EXAMPLE 20

*16-halogeno-5-androstene-3β,11β-diol-17-one*

A solution of 16α-bromo-5-androstene-3β-ol-17-one in propylene glycol is reacted with hog or beef adrenals according to the procedure of Example 19A. The resultant product is isolated in the described manner to give, 16α-bromo-5-androstene-3β,11β-diol-17-one.

In a similar manner, 16β-bromo-5-androstene-3β-ol-17-one, 16α-chloro-5-androstene-3β - ol - 17 - one, and 16β-chloro-5-androstene-3β-ol-17-one are reacted with hog or beef adrenals and the resultant product isolated to give, respectively, 16β-bromo-5-androstene-3β,11β-diol-17-one, 16α-chloro-5-androstene-3β,11β - diol - 17 - one and 16β-chloro-5-androstene-3β,11β-diol-17-one.

EXAMPLE 21

*9α-halogeno-5-androstene-3β,11β-diol-17-one 3-acetate and 16-substituted derivatives thereof*

A. *5-androstene-3β,11β-diol-17-one 3 - acetate.*—5-androstene-3β,11β-diol-17-one is reacted with acetic anhydride in pyridine in the manner described in Example 8C. The resultant product is isolated as described to give 5-androstene-3β,11β-diol-17-one 3-acetate.

In a similar manner, 5-androstene-3β,11β,16α-triol-17-one, 16α-bromo-5-androstene-3β,11β-diol - 17 - one, 16β-bromo-5-androstene-3β,11β-diol-17-one, 16α-chloro-5-androstene-3β,11β-diol-17-one, and 16β - chloro - 5 - androstene-3β,11β-diol-17-one are each reacted with acetic anhydride in pyridine to give, respectively, 5-androstene-3β,11β,16α-triol-17-one 3-16-diacetate, 16α-bromo-5-androstene-3β,11β-diol-17-one 3-acetate, 16β-bromo-5-androstene-3β,11β-diol-17-one 3-acetate, 16α-chloro - 5 - androstene-3β,11β-diol-17-one 3 acetate, and 16β-chloro-5-androstene-3β,11β-diol-17-one 3-acetate.

B. *5,9(11)-androstadiene-3β-ol-17-one 3 - acetate.*—A solution of 5 g. of 5-androstene-3β,11β-diol-17-one 3-acetate in 100 ml. of pyridine is chilled to 0° C. and a solution of 10 ml. of methanesulfonyl chloride in 20 ml. of chloroform is added dropwise. The mixture is allowed to stand in the ice box for 100 hours, then a little ice is added and the solution diluted with chloroform. The organic solution is washed with water, 5 percent hydrochloric acid, 5 percent aqueous sodium bicarbonate, and again with water. The solution is dried over magnesium sulfate, filtered and concentrated in vacuo to a residue which is crystallized from acetone-hexane to give 5,9(11)-androstadiene-3β-ol-17-one 3-acetate.

In a similar manner 5-androstene-3β,11β,16α-triol-17-one 3,16-diacetate, 16α-bromo-5-androstene-3β,11β-diol-17-one 3-acetate, 16β-bromo-5-androstene-3β,11β-diol-17-one 3-acetate, 16α-chloro-5-androstene-3β,11β-diol-17-one 3-acetate, and 16β-chloro-5-androstene-3β,11β - diol - 17-one 3-acetate are each reacted with methanesulfonyl chloride in the manner described above and the resultant product isolated to give, respectively, 5,9(11)-androstadiene-3β,16α-diol-17-one, 3,16-diacetate, 16α-bromo-5,9-(11)-androstadiene-3β-ol-17-one 3-acetate, 16β-bromo-5,9(11)-androstadiene-3β-ol-17-one 3-acetate, 16α-chloro-5,9(11)-androstadiene-3β-ol-17-one 3-acetate, and 16β-chloro-5,9(11)-androstadiene-3β-ol-17-one 3-acetate.

C. *9α-bromo-5-androstene-3β,11β-diol - 17 - one 3-acetate.*—To a solution of 0.155 g. of 5,9(11)-androstadiene-3β-ol-17-one 3-acetate in 20 ml. of dioxane (which has been purified by refluxing over sodium followed by distillation) and 2 ml. of water is added 0.07 g. of N-bromoacetamide and 1 ml. of 1.5 N perchloric acid. The mixture is allowed to stand for 2 hours, then a solution of 0.2 g. of sodium sulfite in 2 ml. of water is added and the mixture extracted with methylene chloride. The organic extracts are combined, washed with water, dried over magnesium sulfate and evaporated to a residue which is crystallized from acetone to give, 9α-bromo-5-androstene-3β,11β-diol-17-one 3-acetate.

In a similar manner 5,9(11)-androstadiene-3β,16α-diol-17-one diacetate, 16α-bromo-5,9(11)-androstadiene-3β-ol-17-one 3-acetate, 16β-bromo-5,9(11)-androstadiene-3β-ol-17-one 3-acetate, 16α-chloro-5,9(11)-androstadiene-3β-ol-17-one 3-acetate, and 16β-chloro-5,9(11)-androstadiene-3β-ol-17-one 3-acetate are each reacted with N-bromoacetamide and perchloric acid to yield respectively, 9α-bromo-5-androstene-3β,11β,16α-triol-17-one 3,16 - diacetate, 9α,16α-dibromo-5-androstene-3β,11β-diol-17-one 3-acetate, 9α,16β - dibromo-5-androstene-3β-11β-diol-17-one 3-acetate, 9α-bromo-16α-chloro-5-androstene-3β,11β-diol-17-one 3-acetate, 9α-bromo-16β-chloro-5-androstene-3β,11β-diol-17-one 3-acetate.

D. *9β,11β-oxido-5-androstene-3β-ol-17-one 3-acetate.*—To 0.150 g. of 9α-bromo-5-androstene-3β,11β-diol-17-one 3-acetate in 30 ml. of acetone is added 0.3 g. of potassium acetate. The reaction mixture is refluxed for 6 hours then the acetone is distilled, water is added to the resultant residue. A solid separates which is filtered and crystallized from methanol-water to give, 9β,11β-oxido-5-androstene-3β-ol-17-one 3-acetate.

In a similar manner 9α-bromo-5-androstene-3β,11β,16α-triol-17-one 3,16-diacetate, 9α,16α-dibromo-5-androstene-3β,11β-diol-17-one 3-acetate, 9α,16β-dibromo-5-androstene-3β,11β-diol-17-one 3-acetate, 9α - bromo-16α-chloro-5-androstene-3β,11β-diol-17-one 3-acetate, and 9α-bromo-16α-chloro-5-androstene-3α,11β-diol-17-one 3-acetate are each reacted with potassium acetate in acetone to give respectively, 9β,11β-oxido-5-androstene-3β,16α-diol-17-one 3,16-diacetate, 9β,11β-oxido-16α-bromo-5-androstene-3β-ol-17-one 3-acetate, 9β,11β-oxido-16β-bromo-5-androstene-3β-ol-17-one 3-acetate, 9β,11β-oxido-16α-chloro-5-androstene-3β-ol-17-one 3-acetate, and 9β,11β-oxido-16β-chloro-5-androstene-3β-ol-17-one 3-acetate.

E. *9α-fluoro-5-androstene-3β-11β-diol-17-one 3 - acetate.*—To 3.5 g. of hydrogen fluoride in 20 ml. of chloroform and 0.6 ml. of tetrahydrofuran at −10° C. is added one g. of 9β,11β-oxido-5-androstene-3β-ol-17-one 3-acetate. The reaction mixture is kept at −10° C. for 3 hours then poured into aqueous sodium carbonate solution. The organic solvent layer is separated from the water and evaporated to a residue which is crystallized from methanol to give, 9α-fluoro-5-androstene-3β,11β-diol-17-one 3-acetate.

In a similar manner, 9β,11β-oxido-5-androstene-3β,16α-diol-17-one diacetate, 9β,11β-oxido-16α-bromo-5-androstene-3β-ol-17-one 3-acetate, 9β,11β-oxido-16β-bromo-5-androstene-3β-ol-17-one 3-acetate, 9β,11β - oxido-16α-chloro-5-androstene-3β-ol-17-one 3-acetate, and 9β,11β-oxido-16β-chloro-5-androstene-3β-ol-17-one 3-acetate are each reacted with hydrogen fluoride in chloroform and tetrahydrofuran in the manner described above to give, respectively, 9α - fluoro-5-androstene-3β,11β,16α-triol-17-one 3,16-diacetate, 9α-fluoro - 16α - bromo-5-androstene-3β,11β-diol-17-one 3-acetate, 9α-fluoro-16β-bromo-5- androstene - 3β,11β-diol-17-one 3-acetate, 9α-fluoro-16α-chloro-5-androstene-3β,11β-diol-17-one 3-acetate, and 9α-fluoro - 16β - chloro-5-androstene-3β,11β-diol-17-one 3-acetate.

F. *9α-chloro-5-androstene- 3β,11β-diol-17-one 3-acetate.*—A solution of one g. of 9β,11β-oxido-5-androstene-3β-ol-17-one 3-acetate in 30 ml. of alcohol-free chloroform is saturated at 0° C. with anhydrous hydrogen chloride and the mixture allowed to stand at 0° C. for 6 hours. The solvent is distilled in vacuo from the reaction mixture leaving a residue which is crystallized from acetone to give 9α-chloro-5-androstene-3β,11β-diol-17-one 3-acetate.

In a similar manner, 9β,11β-oxido-5-androstene-3β,16α-diol-17-one diacetate, 9β,11β-oxido-16α-bromo-5-androstene-3β-ol-17-one 3-acetate, 9β,11β-oxido-16β-bromo-5-androstene-3β-ol-17-one 3-acetate, 9β,11β-oxido - 16α-chloro-5-androstene-3β-ol-17-one 3-acetate, and 9β,11β-oxido-16β-chloro-5-androstene-3β-ol-17-one 3-acetate, are each reacted with anhydrous hydrogen chloride in chloroform to give, respectively, 9α-chloro-5-androstene-3β,11β,16α-triol-17-one 3,16-diacetate, 9α-chloro-16α-bromo-5-androstene-3β,11β-diol-17-one 3-acetate, 9α-chloro-16β-bromo-5-androstene-3β,11β-diol-17-one 3-acetate, 9α,16α-dichloro-5-androstene-3β,11β-diol-17-one 3-acetate, and 9α,16β-dichloro-5-androstene-3β,11β-diol-17-one 3 - acetate.

EXAMPLE 22

*18-nor-D-homo-5,13(17a) - androstadiene - 3β,11 β-diol-17-one 3-acetate, 16-substituted derivatives thereof and their 9α-halogeno derivatives*

A. *18-nor-D-homo-5,13(17a) - androstadiene-3β,11 β-diol-17-one 3-acetate.*—In a manner similar to that described in Example 1A 5-androstene-3β,11β-diol-17-one 3-acetate (the compound of Example 21) is reacted with nitrosyl chloride in pyridine and the resultant product isolated to give 5-androstene-3β,11β-diol-17-one 3-acetate 11-nitrite.

By utilizing the procedure similar to that described in Example 1B 5-androstene-3β,11β-diol-17-one 3-acetate 11-nitrite in toluene is irradiated with a 200 watt mercury lamp and the resultant product isolated and purified to give 18-nor-D-homo-5,13(17a)-androstadiene-3β,11β-diol-17-one 3-acetate.

B. In a similar measure manner to that described in Experiment 22A, 5-androstene-3β,11β,16α-triol-17-one 3,16-diacetate,
16α-bromo-5-androstene-3β,11β-diol-17-one 3-acetate,
16β-bromo-5-androstene-3β,11β-diol-17-one 3-acetate,
16α-chloro-5-androstene-3β,11β-diol-17-one 3-acetate,
16β-chloro-5-androstene-3β,11β-diol-17-one 3-acetate,
9α-fluoro-5-androstene-3β,11β-diol-17-one 3-acetate,
9α-chloro-5-androstene-3β,11β-diol-17-one 3-acetate,
9α-bromo-5-androstene-3β,11β-diol-17-one 3-acetate,
9α-fluoro-5-androstene-3β,11β,16α-triol-17-one 3,16-diacetate,
9α-chloro-5-androstene-3β,11β,16α-triol-17-one 3,16-diacetate,
9α-bromo-5-androstene-3β,11β,16α-triol-17-one 3-16-diacetate,
9α-fluoro-16α-bromo-5-androstene-3β,11β-diol-17-one 3-acetate,
9α-chloro-16α-bromo-5-androstene-3β,11β-diol-17-one 3-acetate,
9α,16α-dibromo-5-androstene-3β,11β-diol-17-one 3-acetate,
9α-fluoro-16β-bromo-5-androstene-3β,11β-diol-17-one 3-acetate,
9α-chloro-16β-bromo-5-androstene-3β,11β-diol-17-one 3-acetate,
9α,16β-dibromo-5-androstene-3β,11β-diol-17-one 3-acetate,
9α-fluoro-16α-chloro-5-androstene-3β,11β-diol-17-one 3-acetate, 9α,16α-dichloro-5-androstene-3β,11β-diol-17-one 3-acetate,
9α-bromo-16α-chloro-5-androstene-3β,11β-diol-17-one 3-acetate,
9α-fluoro-16β-chloro-5-androstene-3β,11β-diol-17-one 3-acetate,
9α-16β-dichloro-5-androstene-3β,11β-diol-17-one 3-acetate and
9α-bromo-16β-chloro-5-androstene-3β,11β-diol-17-one 3-acetate are each reacted with nitrosyl chloride in pyridine to give respectively, 5-androstene-3β,11β,16α-triol-17-one 3,16-diacetate 11-nitrite,
16α-bromo-5-androstene-3β,11β-diol-17-one 3-acetate 11-nitrite,
16β-bromo-5-androstene-3β,11β-diol-17-one 3-acetate 11-nitrite,
16α-chloro-5-androstene-3β,11β-diol-17-one 3-acetate 11-nitrite,
16β-chloro-5-androstene-3β,11β-diol-17-one 3-acetate 11-nitrite,
9α-fluoro-5-androstene-3β,11β-diol-17-one 3-acetate 11-nitrite,
9α-chloro-5-androstene-3β,11β-diol-17-one 3-acetate 11-nitrite,
9α-bromo-5-androstene-3β,11β-diol-17-one 3-acetate 11-nitrite,
9α-fluoro-5-androstene-3β,11β-16α-triol-17-one 3,16-diacetate 11-nitrite,
9α-chloro-5-androstene-3β,11β,16α-triol-17-one 3,16-diacetate 11-nitrite,
9α-bromo-5-androstene-3β,11β,16α-triol-17-one 3,16-diacetate 11-nitrite,
9α-fluoro-16α-bromo-5-androstene-3β,11β-diol-17-one 3-acetate 11-nitrite,
9α-chloro-16α-bromo-5-androstene-3β,11β-diol-17-one 3-acetate 11-nitrite,
9α,16α-dibromo-5-androstene-3β,11β-diol-17-one 3-acetate 11-nitrite,
9α-fluoro-16β-bromo-5-androstene-3β,11β-diol-17-one 3-acetate 11-nitrite,
9α-chloro-16β-bromo-5-androstene-3β,11β-diol-17-one 3-acetate 11-nitrite,
9α,16β-dibromo-5-androstene-3β,11β-diol-17-one 3-acetate 11-nitrite,
9α-fluoro-16α-chloro-5-androstene-3β,11β-diol-17-one 3-acetate 11-nitrite,
9α,16α-dichloro-5-androstene-3β,11β-diol-17-one 3-acetate 11-nitrite,
9α-bromo-16α-chloro-5-androstene-3β,11β-diol-17-one 3-acetate 11-nitrite,
9α-fluoro-16β-chloro-5-androstene-3β,11β-diol-17-one 3-acetate 11-nitrite,
9α,16β-dichloro-5-androstene-3β,11β-diol-17-one 3-acetate 11-nitrite and
9α-bromo-16β-chloro-5-androstene-3β,11β-diol-17-one 3-acetate 11-nitrite.

Each of the aforementioned 11-nitrites are then irradiated with a 200 watt mercury lamp in the manner described to give, respectively, 18-nor-D-homo-5,13(17a)-androstadiene-3β,11β,16α-triol-17-one 3,16-diacetate,
16α-bromo-18-nor-D-homo-5,13(17a)-androstadiene-3β,11β-diol-17-one 3-acetate,
16β-bromo-18-nor-D-homo-5,13(17a)-androstadiene-3β,11β-diol-17-one 3-acetate,
16α-chloro-18-nor-D-homo-5,13(17a)-androstadiene-3β,11β-diol-17-one 3-acetate,
16β-chloro-18-nor-D-homo-5,13(17a)-androstadiene-3β,11β-diol-17-one 3-acetate,
9α-fluoro-18-nor-D-homo-5,13(17a)-androstadiene-3β,11β-diol-17-one 3-acetate,
9α-chloro-18-nor-D-homo-5,13(17a)-androstadiene-3β,11β-diol-17-one 3-acetate,
9α-bromo-18-nor-D-homo-5,13(17a)-androstadiene-3β,11β-diol-17-one 3-acetate,
9α-fluoro-18-nor-D-homo-5,13(17a)-androstadiene-3β,11β,16α-triol-17-one 3,16-diacetate,
9α-chloro-18-nor-D-homo-5,13(17a)-androstadiene-3β,11β,16α-triol-17-one-3,16-diacetate,
9α-bromo-18-nor-D-homo-5,13(17a)-androstadiene-3β,11β,16α-triol-17-one 3,16-diacetate,
9α-fluoro-16α-bromo-18-nor-D-homo-5,13(17a)-androstadiene-3β,11β-diol-17-one 3-acetate,
9α-chloro-16α-bromo-18-nor-D-homo-5,13(17a)-androstadiene-3β,11β-diol-17-one 3-acetate,
9α,16α-dibromo-18-nor-D-homo-5,13(17a)-androstadiene-3β,11β-diol-17-one 3-acetate,
9α-fluoro-16β-bromo-18-nor-D-homo-5,13(17a)-androstadiene-3β,11β-diol-17-one 3-acetate,
9α-chloro-16β-bromo-18-nor-D-homo-5,13(17a)-androstadiene-3β,11β-diol-17-one 3-acetate,
9α,16β-dibromo-18-nor-D-homo-5,13(17a)-androstadiene-3β,11β-diol-17-one 3-acetate,
9α-fluoro-16α-chloro-18-nor-D-homo-5,13(17a)-androstadiene-3β,11β-diol-17-one 3-acetate,
9α,16α-dichloro-18-nor-D-homo-5,13(17a)-androstadiene-3β,11β-diol-17-one 3-acetate,
9α-bromo-16α-chloro-18-nor-D-homo-5,13(17a)-androstadiene-3β,11β-diol-17-one 3-acetate,
9α-fluoro-16β-chloro-18-nor-D-homo-5,13(17a)-androstadiene-3β,11β-diol-17-one- 3-acetate,
9α,16β-dichloro-18-nor-D-homo-5,13(17a)-androstadiene-3β,11β-diol-17-one 3-acetate, and
9α-bromo-16β-chloro-18-nor-D-homo-5,13(17a)-androstadiene-3β,11β-diol-17-one 3-acetate.

EXAMPLE 23

*Preparation of 18-nor-D-homo-1,3,5(10),13(17a)-estratetraenes and 18-nor-D-homo-19-nor-4,13(17a)-androstadienes*

A. *11β-hydroxylation of 1,3,5(10)-estratrienes and 19-nor-4-androstenes.*—A solution of 3-methoxy-16β-methyl-1,3,5(10)-estratriene-17-one in propylene glycol is reacted with adrenal gland tissue in the manner described in Example 19A. The resultant product is isolated in the described manner to give 3-methoxy-16β-methyl-1,3,5(10)-estratriene-11β-ol-17-one.

In a similar manner,

16β-methyl-1,3,5(10)-estratriene-3-ol-17-one,
16β-bromo-1,3,5(10)-estratriene-3-ol-17-one,
16α-bromo-1,3,5(10)-estratriene-3-ol-17-one 3-acetate,
6β-methyl-1,3,5(10)-estratriene-3-ol-17-one,
6-methyl-1,3,5(10),6-estratetraene-3-ol-17-one,
1,3,5(10)-estratriene-3,16α-diol-17-one,
6β-fluoro-19-nor-4-androstene-3,17-dione and
16β-methyl-19-nor-4-androstene-3,17-dione are each reacted with adrenal tissue in propylene glycol in the manner described in Example 19A to give the corresponding 11-hydroxy derivatives, i.e., 16β-methyl-1,3,5(10)-estratriene-3,11β-diol-17-one,
16β-bromo-1,3,5(10)-estratriene-3,11β-diol-17-one,
16α-bromo-1,3,5(10)-estratriene-3,11β-diol-17-one 3-acetate,
6β-methyl-1,3,5(10)-estratriene-3,11β-diol-17-one,
6-methyl-1,3,5(10),6-estratetraene-3,11β-diol-17-one,
1,3,5(10)-estratriene-3,11β,16α-triol-17-one,
6β-fluoro-19-nor-4-androstene-11β-ol-3,17-dione and
16β-methyl-19-nor-4-androstene-11β-ol-3,17-dione.

B. *Esterification of hydroxyl groups present other than at C–11.*—To a solution of 100 mg. of 16β-methyl-1,3,5(10)-estratriene-3,11β-diol-17-one in 2 ml. of pyridine is added 35 mg. of acetic anhydride. The reaction mixture is allowed to stand at room temperature for 3 hours then is poured into cold dilute hydrochloric acid and stirred for 15 minutes. A solid separates which is filtered and dried to give 16β-methyl-1,3,5(10)-estratriene-3,11β-diol-17-one 3-acetate.

In a similar manner, 16β-bromo-1,3,5(10)-estratriene-3,11β-diol-17-one, 6β-methyl - 1,3,5(10)-estratriene-3,11β-diol - 17 - one, 6-methyl-1,3,5(10),6-estratetraene-3,11β-diol-17-one, and 1,3,5(10)-estratriene-3,11β,16α-triol-17-one are each reacted with acetic anhydride in pyridine to give respectively 16β-bromo-1,3,5(10)-estratriene-3,11β-diol-17-one 3-acetate, 6β-methyl-1,3,5(10)-estratriene-3,11β-diol-17-one 3-acetate, 6-methyl-1,3,5(10),6-estratetraene-3,11β-diol-17-one 3-acetate and 1,3,5(10)-estratriene-3,11β,16α-triol 3,16-diacetate.

C. *11-nitrite esters of 1,3,5(10)-estratrienes and 19-nor-4-androstenes.*—3 - methoxy-16β-methyl-1,3,5(10)-estratriene-11β-ol-17-one in pyridine is reacted with nitrosyl chloride in a manner similar to that described in Example 1A. The resultant product is isolated as described to give 3-methoxy-16β-methyl - 1,3,5(10) - estratriene - 11β - ol-17-one 11-nitrite.

In a similar manner the 11β-hydroxy estratrienes and 19-nor-4-androstenes prepared as described in Example 23A and protectively esterified as shown in Example 23B are each reacted with nitrosyl chloride in pyridine to yield respectively 16β-methyl-1,3,5(10)-estratriene - 3,11β-diol-17-one 3-acetate 11-nitrite, 16β-bromo-1,3,5(10)-estratriene-3,11β-diol-17-one 3-acetate 11-nitrite, 16α-bromo-1,3,5(10)-estratriene-3,11β-diol-17-one 3-acetate 11-nitrite, 6β-methyl-1,3,5(10)-estratriene-3,11β-diol-17-one 3 - acetate 11-nitrite, 6 - methyl-1,3,5(10),6-estratetraene-3,11β-diol-17-one 3-acetate 11-nitrite, 1,3,5(10) - estratriene - 3,11β,16α-triol-17-one 3,16-diacetate 11-nitrite, 6β-fluoro-19-nor-4-androstene-11β-ol-3,17-dione 11-nitrite and 16β-methyl-19-nor-4-androstene-11β-ol-3,17-dione 11-nitrite.

D. *Photolysis of the 11-nitrite esters of 1,3,5(10)-estratrienes and 19-nor-4-androstenes.*—3-methoxy-16β-methyl-1,3,5(10)-estratriene-11β-ol-17-one 11-nitrite in benzene under a blanket of nitrogen is irradiated with a 200 watt mercury lamp provided with a Pyrex filter in a manner described in Example 8A. The resultant product is isolated in a manner similar to that described in Example 8A to give 3-methoxy-16β-methyl-18-nor-D-homo-1,3,5(10),13(17a)-estratetraene-11β-ol-17-one.

Similarly, the 11-nitrite ester intermediates prepared as described in Example 23C are each irradiated with ultraviolet light and isolated to give respectively 16β-methyl-18-nor-D-homo-1,3,5(10),13(17a)-estratetraene-3,11β-diol-17-one 3-acetate,
16β-bromo-18-nor-D-homo-1,3,5(10),13(17a)-estratetraene-3,11β-diol-17-one 3-acetate,
16α-bromo-18-nor-D-homo-1,3,5(10),13(17a)-estratetraene-3,11β-diol-17-one 3-acetate,
6β-methyl-18-nor-D-homo-1,3,5(10),13(17a)-estratetraene-3,11β-diol-17-one 3-acetate,
6-methyl-1,3,5(10),6,13(17a)-estrapentaene-3,11β-diol-17-one 3-acetate,
18-nor-D-homo-1,3,5(10),13(17a)-estratetraene-3,11β,16α-triol 3,16-diacetate,
6β-fluoro-18,19-bis-nor-D-homo-4,13(17a)-androstadiene-11β-ol-3,17-dione, and
16β-methyl-18,19-bis-nor-D-homo-4,13(17a)-androstadiene-11β-ol-3,17-dione.

E. *Hydrolysis of any ester groups present.*—16β-methyl-18-nor-D-homo-1,3,5(10),13(17a)-estratetraene-3,11β-diol-17-one 3-acetate, 16β - bromo-18-nor-D-homo-1,3,5(10),13(17a)-estratetraene-3,11β-diol - 17 - one 3-acetate, 16α-bromo-18-nor-D-homo - 1,3,5(10),13(17a) - estratetraene-3,11β-diol-17-one 3-acetate, 6β-methyl-18 - nor - D-homo-1,3,5(10),13(17a)-estratetraene - 3,11β-diol-17-one 3-acetate, and 6-methyl-18-nor-D - homo - 1,3,5(10),6,13(17a)-estrapentaene-3,11β-diol-17-one 3-acetate are each subjected to the action of a culture of *Flavobacterium dehydrogenans* according to the procedure of Example 9 to give respectively 16β-methyl-18-nor-D - homo - 1,3,5(10), 13(17a)-estratetraene-3,11β-diol-17-one, 16β - bromo-18-nor - D-homo-1,3,5(10),13(17a)-estratetraene-3,11β-diol-17-one, 16α-bromo-18-nor-D-homo-1,3,5(10),13(17a)-estratetraene-3,11β-diol-17-one, 6β-methyl-18-nor-D-homo-1,3,5(10),13(17a)-estratetraene-3,11β-diol-17 - one and 6-methyl-1,3,5(10),6,13(17a) - estrapentaene-3,11β-diol-17-one.

To 0.5 g. of 18-nor-D-homo-1,3,5(10),13(17a)-estratetraene-3,11β,16α-triol-17-one 3,16-diacetate in 30 ml. of methanol there is added 300 mg. of sodium carbonate. The reaction mixture is stirred over night at room temperature then added to 100 ml. of water and neutralized with acetic acid. The aqueous mixture is filtered and the filtrate extracted with methylene chloride. Methylene chloride extracts are combined, dried over sodium sulfate, then concentrated in vacuo to a residue containing 18-nor-D-homo-1,3,5(10),13(17a)-estratetraene-3,11β,16α - triol-17-one.

EXAMPLE 24

*9α-halogeno-11β-hydroxy-1,3,5(10)-estratrienes and 19-nor-4-androstenes*

A. *3-methoxy-1,3,5(10),9(11)-estratetraene-17-one.* — In a manner similar to that described in Example 21B 3-methoxy-1,3,5(10)-estratriene-11β-ol-17 - one in pyridine is reacted with methanesulfonyl chloride and the resultant product isolated as described to give 3-methoxy-1,3,5(10),9(11)-estratetraene-17-one.

B. *3-methoxy-9α-bromo-1,3,5(10) - estratriene-11β-ol-17-one.*—To a solution of 1 gram of 3-methoxy-1,3,5(10),9(11)-estratetraene-17-one in 100 ml. of dioxane is added 10 ml. of water, 515 mg. of N-bromoacetamide and 4 ml. of 1.5 N-perchloric acid. The mixture is stirred at room temperature for 4 hours then 1 gram of sodium sulfite in 10 ml. of water is added and the solution extracted with methylene chloride. The extracts are washed with water, dried and concentrated in vacuo to a residue which is crystallized from methylene chloride-pentane to give 3-methoxy-9α-bromo-1,3,5(10)-estratriene-11β-ol-17-one.

C. *3-methoxy - 9β,11β - oxido-1,3,5(10)-estratriene-17-one.*—A solution of 1 gram of 3-methoxy-9α-bromo-1,3,5(10)-estratriene-11β-ol-17-one in 50 ml. of acetone is heated at reflux temperature for 5 hours with 1 gram of potassium acetate. The acetone is distilled in vacuo, the resultant residue is triturated with water. A solid separates which is filtered from ether-pentane to give 3-methoxy-9β,11β-oxido-1,3,5(10)-estratriene-17-one.

D. *3-methoxy-9α-fluoro-1,3,5(10)-estratriene - 11β - ol-17-one.*—To a solution of 500 mg. of the 9β,11β-oxido-estratriene of Example 24C in 20 ml. of alcohol-free chloroform there is added at 0° C. a molar excess of a solution of hydrogen fluoride in 2:1 tetrahydrofuran-chloroform. The mixture is kept at 0° C. for 4 hours, then is poured into ice water, neutralized with sodium carbonate, and extracted with methylene chloride. The organic extracts are washed with water then concentrated in vacuo to a residue which is crystallized from methylene chloride-pentane to give 3-methoxy-9α-fluoro-1,3,5,(10)-estratriene-11β-ol-17-one.

E. *3-methoxy-9α-chloro-1,3,5(10)-estratriene - 3β - ol-17-one.*—3-methoxy-9β,11β-oxido-1,3,5,(10) - estratriene-17-one in chloroform is reacted with anhydrous hydrogen chloride in the manner described in Example 21F to give 3-methoxy-9α-chloro-1,3,5(10) - estratriene - 11β - ol - 17-one.

Similarly, the following 11β-hydroxy-estratriene and 11β-hydroxy-19-nor-4-androstenes are each subjected to a series of reactions described in Examples 24A–E whereby there is obtained the corresponding 9α-halogeno derivatives, i.e., the 9α-bromo, 9α-fluoro, and 9α-chloro derivatives thereof;

1,3,5(10)-estratriene-3,11β-diol-17-one 3-acetate,
3-methoxy-16β-methyl-1,3,5,(10)-estratriene-11β-ol-17-one, 16β-methyl-1,3,5,(10)-estratriene-3,11β-diol-17-one 3-acetate,
16α-bromo-1,3,5(10)-estratriene-3,11β-diol-17-one 3-acetate,
6β-methyl-1,3,5(10)-estratriene-3,11β-diol-17-one 3-acetate,
6α-fluoro-1,3,5(10)-estratriene-3,11β-diol-17-one 3-acetate,
19-nor-4-androstene-11β-ol-3,17-dione,
6β-fluoro-19-nor-4-androstene-11β-ol-3,17-dione and
16β-methyl-19-nor-4-androstene-11β-ol-3,17-dione.

EXAMPLE 25

*9α-halogeno-18-nor-D-homo-13(17a)-dehydro-estratrienes and 19-nor-4-androstenes*

A. *3-methoxy-9α-halogeno-18-nor-D-homo-1,3,5(10),-13(17a)-estratetraene-11β-ol-17-one.*—3 - methoxy - 9α-fluoro-1,3,5(10)-estratriene-11β-ol-17-one is reacted with nitrosyl chloride in pyridine in the manner similar to that described in Example 1A. The resultant product is isolated as described to give 3-methoxy-9α-fluoro-1,3,5(10)-estratriene-11β-ol-17-one 11-nitrite which is dissolved in benzene then irradiated with a 200 watt mercury lamp in the manner described in Example 23D. The resultant product is isolated in the manner similar to the described to give 3-methoxy-9α-fluoro-18-nor-D-homo - 1,3,5(10),-13(17a)-estratetraene-11β-ol-17-one.

Similarly, 3-methoxy-9α-chloro - 1,3,5(10) - estratriene-11β-ol-17-one and 3-methoxy-9α-bromo-1,3,5(10)-estratriene-11β-ol-17-one are each converted to their respective 11-nitrite esters which upon irradiation with ultraviolet light according to the process of Example 23D yields 3-methoxy-9α-chloro-18-nor-D - homo - 1,3,5(10),13(17a)-estratetraene-11β-ol-17-one, and 3-methoxy-9α-bromo-18-nor-D-homo-1,3,5(10),13(17a) - estratetraene - 11β-ol-17-one.

B. By going through a similar sequence of reaction as is described in Example 25A the 9α-halogeno-11β-hydroxy-estratriene and 19-nor-4-androstenes prepared as described in Example 24 are each converted to their respective 11-nitrite esters and then irradiated with a 200 watt mercury lamp to yield the corresponding 18-nor-D-homo-13(17a)-dehydro derivatives respectively, i.e., 9α-fluoro-18-nor-D-homo-1,3,5(10)-estratriene-3,11β-diol-17-one 3-acetate,
3-methoxy-9α-fluoro-16β-methyl-18-nor-D-homo-1,3,5(10),13(17a)-estratetraene-11β-ol-17-one,
9α-fluoro-16β-bromo-18-nor-D-homo-1,3,5(10),13(17a)-estratetraene-3,11β-diol-17-one 3-acetate,
9α-fluoro-16α-bromo-18-nor-D-homo-1,3,5(10),13(17a)-estratetraene-3,11β-diol-17-one 3-acetate,
6β-methyl-9α-fluoro-18-nor-D-homo-1,3,5(10),13(17a)-estratetraene-3,11β-diol-17-one 3-acetate,
6α,9α-difluoro-18-nor-D-homo-1,3,5(10),13(17a)-estratetraene-3,11β-diol-17-one 3-acetate,
9α-fluoro-18,19-bis-nor-D-homo-4,13(17a)-androstadiene-11β-ol-3,17-dione,
6β,9α-difluoro-18,19-bis-nor-D-homo-4,13(17a)-androstadiene-11β-ol and
9α-fluoro-16β-methyl-18,19-bis-nor-D-homo-4,13(17a)-androstadiene-11β-ol-3,17-dione and
their corresponding 9α-chloro, and 9α-bromo derivatives.

C. *Hydrolysis of the 3-acetate ester.*—9α-fluoro-18-nor-D-homo-1,3,5(10),13(17a)-estratetraene-3,11β - diol - 17-one 3-acetate, 9α-fluoro-16β-bromo - 18 - nor - D - homo-1,3,5(10),13(17a)-estratetraene-3,11β - diol - 17 - one 3-acetate, 9α-fluoro-16α-bromo-18-nor-D-homo - 1,3,5(10),-13(17a)-estratetraene-3,11β-diol-17 - one 3 - acetate, 6β-methyl-9α-fluoro-18 - nor - D - homo - 1,3,5(10),13(17a)-estratetraene-3,11β-diol-17-one 3-acetate and the 6α,9α-difluoro-18-nor - D-homo - 1,3,5(10),13(17a) - estratetraene-3,11β-diol-17-one 3-acetate, are each subjected to the action of a culture of *Flavobacterium dehydrogenans* according to the procedure of Example 9 and there is obtained, respectively, 9α - fluoro - 18 - nor - D - homo-1,3,5(10),13(17a)-estratetraene-3,11β-diol - 17 - one, 9α-fluoro-16β-bromo-18-nor - D - homo - 1,3,5(10),13(17a)-estratetraene-3,11β-diol-17-one, 9α-fluoro-16α-bromo-18-nor-D-homo-1,3,5(10),13(17a)-estratetraene-3,11β - diol-17-one, 6β-methyl-9α-fluoro-18-nor-D - homo - 1,3,5(10),-13(17a)-estratetraene-3,11β-diol - 17 - one and 6α,9α - difluoro-18-nor-D-homo - 1,3,5(10),13(17a) - estratetraene-3,11β-diol-17-one.

EXAMPLE 26

*16α-hydroxy-18-nor-D-hydro-11β-hydroxy-androstanes and estranes*

A. *Preparation of 11β,16α-dihydroxy androstanes and estranes.*—Slant washings taken from a culture of a microorganism designated as *Streptomyces halstedii* (A.T.C.C. 13,499) are inoculated into a sterile nutrient medium having the following composition:

| | Grams |
|---|---|
| Cerelose (dextrose hydrate) | 10 |
| Yeast extract | 5 |
| NZ Amine B (enzymatic digest of casein) | 10 |
| Calcium carbonate | 1 |
| Distilled water in sufficient volume for a 1000 ml. solution. | |

The above inoculated medium is then adjusted to a pH of 6.7 with potassium hydroxide and incubation subsequently carried out at 28° C. for 48 hours via a rotary shaker. There is thus formed a suitable pre-grown inoculum for purposes of seeding.

A two liter portion of sterile nutrient medium of the composition described above contained in a 4-liter fermenting vessel is autoclaved at 122° C./20 lbs. per sq. in. for 60 minutes, then cooled to room temperature. Five percent of the pre-grown inoculum prepared as described in the first paragraph above is then introduced into the medium with constant agitation being maintained. The fermentation is then conducted at 28° C. for 24 hours, employing an aeration rate of one-half volume of air per volume of broth per minute and maintaining a constant agitation rate of 1700 r.p.m.

After completion of a 24-hour growth period, the heavy mycelium so obtained is removed by passing the whole broth through a filter system consisting of glass wool and gauze. The isolated mycelium is then suspended in two liters of tap water contained in a fermentation pot equipped with a stirring apparatus. To the stirred suspension there is added 250 mg. of 4-androstene-11β-ol-3,17-dione dissolved in a minimum amount of acetone-ethanol (1:1 by volume). The fermentation is continued under the same conditions as previously described for 16 hours. At the end of this time, the whole broth is successively extracted with three equivalent volumes of methyl isobutyl ketone. The combined solvent extracts are then concentrated in vacuo to a residue which is crystallized from ethyl acetate to give 4-androstene-11β,16α,diol-3,17-dione.

Other steroid substrates such as 1,4-androstadiene-11β-ol-3,17-dione and the
6α-fluoro analog thereof,
9α-bromo-4-androstene-11β-ol-3,17-dione,
4,6-androstadiene-11β-ol-3,17-dione,
5α-1-androstene-11β-ol-3,17-dione and the
9α-fluoro-analog thereof,
1,4,6-androstatriene-11β-ol-3,17-dione,
6α-methyl-4-androstene-11β-ol-3,17-dione,
6α-fluoro-4-androstene-11β-ol-3,17-dione,
6β-fluoro-4-androstene-11β-ol-3,17-dione,
19-nor-4-androstene-11β-ol-3,17-dione and the
6α-fluoro analog thereof,
2α-methyl-9α-iodo-4,6-androstadiene-11β-ol-3,17-dione,
3-methoxy-1,3,5(10)-estratriene-11β-ol-17-one,
3-acetoxy-1,3,5(10)-estratriene-11β-ol-17-one and the 6α-fluoro analog thereof, and
3-acetoxy-6β-methyl-9α-fluoro-1,3,5(10)-estratriene-11β-ol-17-one and the
9α-fluoro-analog thereof are each individually subjected to the action of *Streptomyces halstedii* (A.T.C.C. 13,499) in the manner described above. In each case the corresponding 16α-hydroxylated derivative of the respective steroid substrate is obtained.

B. *Preparation of the 11-nitrite-16α-acetoxy intermediates.*—Each of the 11β,16α-dihydroxy intermediates prepared as described in Example 26A is reacted with acetic anhydride in pyridine in the manner described in Example 23B and there is obtained the corresponding 16α-acetate ester; each of which is reacted with nitrosyl chloride in pyridine in the manner described in Example 1A to give the respective 11-nitrite-16-acetate ester intermediate, i.e., 4-androstene-11β,16α-diol-3,17-dione 11-nitrite 16-acetate,
1,4-androstadiene-11β,16α-diol-3,7-dione 11-nitrite 16-acetate and the
6α-fluoro analog thereof,
9α-bromo-4-androstene-11β,16α-diol-3,17-dione 11-nitrite 16-acetate,
4,6-androstadiene-11β,16α-diol-3,17-dione 11-nitrite 16-acetate,
5α-1-androstene-11β,16α-diol-3,17-dione 11-nitrite 16-acetate and the
9α-fluoro analog thereof,
1,4,6-androstatriene-11β,16α-diol-3,17-dione 11-nitrite 16-acetate,
6α-methyl-4-androstene-11β,16α-diol-3,17-dione 11-nitrite 16-acetate,
6α-fluoro-4-androstene-11β,16α-diol-3,17-dione 11-nitrite 16-acetate,
6β-fluoro-4-androstene-11β,16α-diol-3,17-dione 11-nitrite 16-acetate,
19-nor-4-androstene-11β,16α-diol-3,17-dione 11-nitrite 16-acetate and the
6α-fluoro-analog thereof,
2α-methyl-9α-iodo-4,6-androstadiene-11β,16α-diol-3,17-dione 11-nitrite 16-acetate,
3-methoxy-1,3,5(10)-estratriene-11β,16α-diol-17-one 11-nitrite 16-acetate,
3-acetoxy-,3,5(10)-estratriene-11β,16α-diol-17-one 11-nitrite 16-acetate and the
6α-fluoro and 6β-methyl analog thereof and
3-acetoxy-6β-methyl-9α-fluoro-13,5(10)-estratriene-11β,16α-diol-17-one 11-nitrite 16-acetate.

C. *Preparation of the 16α-acetoxy-18-nor-D-homo-13 (17a)-dehydro-androstanes and estranes.*—Each of the 11-nitrite 16-acetate ester intermediates prepared as described in Example 27B is individually irradiated with a 200 watt mercury lamp provided with a Pyrex filter in a manner similar to that described in Example 8A and there is obtained respectively 18-nor-D-homo-4,13(17a)-androstadiene-11β,16α-diol-3,17-dione 16-acetate,
18-nor-D-homo-1,4,13(17a)-androstatriene-11β,16α-diol-3,17-dione 16-acetate and the 6α-fluoro analog thereof,
9α-bromo-18-nor-D-homo-4,13(17a)-androstadiene-11β,16α-diol-3,17-dione 16-acetate,
18-nor-D-homo-4,6,13(17a)-androstatriene-11β,16α-diol-3,17-dione 16-acetate,
18-nor-D-homo-5α-1,13(17a)-androstadiene-11β,16α-diol-3,17-dione and the 9α-fluoro-analog thereof,
18-nor-D-homo-1,4,6,13(17a)-androstatetraene-11β,16α-diol-3,17-dione 16-acetate,
6α-methyl-18-nor-D-homo-4,13(17a)-androstadiene-11β,16α-diol-3,17-dione 16-acetate,
6α-fluoro-18-nor-D-homo-4,13(17a)-androstadiene-11β,16α-diol-3,17-dione 16-acetate and the 6β-fluoro-epimer thereof,
18,19-bis-nor-D-homo-11β,16α-diol-3,17-dione 16-acetate and the 6α-fluoro analog thereof,
2α-methyl-9α-iodo-18-nor-D-homo-4,6,13(17a)-androstatriene-11β,16α-diol-3,17-dione 16-acetate,
3-methoxy-18-nor-D-homo-1,3,5(10),13(17a)-estratetraene-11β,16α-diol-17-one 16-acetate,
18-nor-D-homo-1,3,5(10),13(17a)-estratetraene-3,11β,16α-triol-17-one 3,16-diacetate and the 6α-fluoro analog thereof and the
6β-methyl analog and the 6β-methyl-9α-fluoro-18-nor-D-homo-1,3,5(10),13(17a)-estratetraene-3,11β,16α-triol-17-one 3,16-diacetate.

D. *Hydrolysis of ester groups.*—A 16-acetoxy-18-nor-D-homo-steroid, prepared as described in Example 26C, is hydrolyzed with sodium carbonate in methanol in the manner similar to that described in Example 23E and there is obtained the corresponding 16α-hydroxy steroid. Other ester groups present such as the 3-acetoxy are also hydrolyzed to the corresponding 3-hydroxy steroid.

EXAMPLE 27

*Preparation of 11-keto-18-nor-D-homo-13(17a)-dehydro-androstanes and pregnanes*

A. *18-nor-D-homo - 4,13(17a)-androstadiene - 3,11,17-trione (tautomeric forms 18-nor-D-homo-4,12,17a(17)-androstatriene-17-ol-3,11-dione, and 18 - nor - D-homo-4,11,13(17a)-androstatriene-11-ol-3,17-dione).*—To a solution of 500 mg. of 18-nor-D-homo-4,13(17a)-androstadiene-11β-ol-3,17-dione in 200 ml. of purified acetone chilled to 5° C. is added dropwise with stirring 0.45 ml. (109 percent of theory) of chromic/sulfuric acid reagent (266 mg. chromic acid per ml.). The mixture is stirred at 5° C. for 5 minutes then diluted with water. The aqueous mixture is extracted with ethyl acetate. The organic extracts are combined, washed with water, and concentrated in vacuo to a residue which is crystallized from acetone-ether to give 18-nor-D-homo-4,13(17a)-androstadiene-3,11,17-trione.

B. In a similar manner, by utilizing the above procedure each of the 11β-hydroxy-18-nor-D-homo-androstanes and estranes prepared as described in the preceding examples may be oxidized to the corresponding 11-keto derivative and its tautomeric forms. For example, 18-nor-D-homo-1,4,13(17a)-androstatriene-3,11,17-trione and the 9α-fluoro analog thereof,
18-nor-D-homo-4,6,13(17a)-androstatriene-3,11,17-trione,
18-nor-D-homo-1,4,6,13(17a)-androstatetraene-3,11,17-trione,
18-nor-D-homo-5α-1,13(17a)-androstadiene-3,11,17-trione,
3-acetoxy-18-nor-D-homo-5,13(17a)-androstadiene-11,17-dione,
18,19-bis-nor-D-homo-4,13(17a)-androstadiene-3,11,17-trione,
3-methoxy-18-nor-D-homo-1,3,5(10),13(17a)-estratetraene-11,17-dione and
3-acetoxy-18-nor-D-homo-1,3,5(10),13(17a)-estratetraene-11,17-dione are each derived from the corresponding 11-hydroxy derivatives by oxidation with chromic/sulfuric acid.

C. *Esterification of the enol tautomeric forms of 18-nor-D-homo-4,13(17a)-androstadiene-3,11,17-trione.*— A solution of 100 mg. of 18-nor-D-homo-4,13(17a)-androstadiene-3,11,17-trione (prepared as described in Example 27A) in 2 ml. of pyridine and 0.2 ml. of acetic anhydride is allowed to stand at room temperature for 18 hours. The reaction mixture is then poured into ice water and the resultant precipitate filtered, washed with water, dried and crystallized from acetone-hexane to yield a mixture of the acetate esters of the tautomeric forms of the starting compound namely, a mixture of 11-acetoxy-18-nor-D-homo-4,11,13(17a)-androstatriene-3,17-dione and 17-acetoxy-18-nor-D-homo-4,12,17a(17)-estratriene-3,11-dione with the latter 17-acetoxy ester predominating.

By substituting other alkanoic acid esters, such as butyric and caproic acid in the above procedure there is obtained the corresponding butyrate ad caproate ester mixtures at C–11 and C–17 respectively.

In a similar manner, each of the 11, 17-diketo-18-nor-D-homo-13(17a)-dehydroandrostanes and estranes, prepared as described in Example 27A, may be esterified according to the procedure of this example and there is obtained a mixture of the esters of the tautomeric forms, namely, the corresponding 11-acyloxy-17-keto-18-nor-D-homo-11,13(17a)-bisdehydroandrostanes or estranes and the 11 - keto-17-acyloxy-18-nor-D-homo-12,17a(17)-bisdehydroandrostanes or estranes. For example, 3-methoxy - 18 - nor-D-homo-1,3,5(10),13(17a)-estratetraene-11,17-dione upon reaction with caproic anhydride in pyridine yields a mixture of 3-methoxy-11-caproyloxy-18-nor-D - homo-1,3,5(10),11,13(17a)-estrapentaene-17-one and 3 - methoxy-17-caproyloxy-18-nor-D-homo-1,3,5(10),12,17a(17)-estrapentaene 11-one.

EXAMPLE 28

*Preparation of 11-dehydro-18-nor-D-homo-13(17a)-dehydroandrostanes and estranes*

A. *18 - nor-D-homo-4,11,13(17a)-androstatriene-3,17-dione.*—A suspension of 100 mg. of 18-nor-D-homo-4,13(17a)-androstadiene-11β-ol-3,17-dione (the compound of Example 1) in 7 ml. of methanol containing 0.5 ml. of perchloric acid is stirred at room temperature for 18 hours. The resulting solution is poured into water and the aqueous mixture extracted with methylene chloride. The organic extracts are combined, washed with water and sodium bicarbonate solution, dried, and concentrated in vacuo to a residue which is crystallized twice from acetonehexane to give 18-nor-D-homo-4,11,13(17a)-androstatriene-3,17-dione, M.P. 189–192° C;

$[\alpha]_D$ —88° (CHCl₃); $\lambda\lambda_{max}^{MeOH}$ 238 mμ ($\epsilon$15,200), 280 mμ ($\epsilon$29,100); $\lambda\lambda$Nujol 6.00, 6.06, 6.20, 6.32μ

B. *18 - nor - D-homo-1,4,11,13(17a)-androstatetraene-3,17 - dione.*—18 - nor-D-homo-1,4,13(17a)-androstatriene-11β-ol-3,17-dione, the compound of Example 2 is reacted with perchloric acid in methanol according to the procedure of Example 28A to give 18-nor-D-homo-1,4,11,13(17a)-estratetraene-3,17-dione, M.P. 200–202° C.;

$[\alpha]_D$ —193° (CHCl₃); $\lambda_{max}^{MeOH}$ 278 mμ ($\epsilon$34,000); $\lambda\lambda$Nujol 5.99, 6.16, 6.21, 6.29μ

C. In a similar manner by utilizing the procedure of Example 28A each of the 11β-hydroxy-18-nor-D-homo-13(17a)-dehydroandrostanes and estranes may be dehydrated to the corresponding 11-dehydro derivative, for example, 9α-fluoro-18-nor-D-homo-1,4,11,13(17a)-androstatetraene-3,17-dione,
18-nor-D-homo-4,6,11,13(17a)-androstatetraene-3,17-dione,
18-nor-D-homo-1,4,6,11,13(17a)-androstapentaene-3,17-dione,
18-nor-D-homo-5α-1,11,13(17a)-androstatriene-3,17-dione,
3-acetoxy-18-nor-D-homo-5,11,13(17a)-androstatriene-17-one,
18,19-bis-nor-D-homo-4,11,13(17a)-androstatriene-3,17-dione,
3-methoxy-18-nor-D-homo-1,3,5(10),11,13(17a)-estrapentaene-17-one are each derived from the corresponding 11-hydroxy derivative by dehydration with perchloric acid in methanol.

Ester groups present in the molecule prior to dehydration with perchloric acid in methanol will be hydrolyzed during the reaction carried out according to the procedure of Example 28A. Thus, for example, 18-nor-D-homo-1,3,5(10),13(17a)-estratetraene-3,11β-diol-17-one 3-acetate and 18-nor-D-homo-5,13(17a)-androstadiene-3β,11β-diol-17-one 3-acetate upon reaction with perchloric acid in methanol yield 18-nor-D-homo-1,3,5(10),11,13(17a)-estrapentaene-3 - ol-17-one and 18-nor-D-homo-5,11,13(17a)-androstatriene-3β-ol-17-one respectively.

EXAMPLE 29

*Preparation of 11-esters of 11-hydroxy-18-nor-D-homo-13(17a)-dehydroandrostanes and estranes*

A. *18 - nor - D-homo-4,13(17a)-androstadiene-11β-ol-3,17-dione-11-acetate and the 1-dehydro analog thereof.*—100 mg. of 18-nor-D-homo-4,13(17a)-androstadiene-11β-ol-3,17-dione in 3 ml. of pyridine and ½ ml. of acetic anhydride is allowed to stand at room temperature for 18 hours. The reaction mixture is poured into ice water and extracted with methylene chloride. The organic extracts are combined, washed with water, then concentrated to a residue which is recrystallized from acetone-hexane to give 18 - nor-D-homo-4,13(17a)androstadiene-11β-ol-3,17-dione 11-acetate, M.P. 161–165° C.

$[\alpha]_D$ +148 (CHCl₃); $\lambda_{max}^{MeOH}$ 239 mμ ($\epsilon$34,000)

18 - nor - D - homo-1,4,13(17a)-androstatriene-11β-ol-3,17-dione (the compound of Example 2) is reacted with acetic anhydride in pyridine in the above manner to give 18 - nor-D-homo-1,4,13(17a)-androstatriene-11β-ol-3,17-dione 11-acetate M.P. 199–201° C.

$[\alpha]_D$ +80 (CHCl₃); $\lambda_{max}^{MeOH}$ 240 mμ ($\epsilon$32,000)

In a similar manner, by substituting the acid anhydrides of other lower alkanoic acids, such as, propionic, valeric, t-butyl acetic acid, for acetic anhydride in the above procedure there is obtained the corresponding 11-propionate, 11-valerate or 11-t-butyl acetate of 18-nor-D-homo-4,13(17a)-androstadiene-11β-ol-3,17-dione and 18-nor - D-homo-1,4-13(17a)-androstatriene-11β-ol-3,17-dione respectively.

B. *18 - nor - D-homo-4,13(17a)-androstadiene-11β-ol-3,17 - dione - 11-benzoate.*—18-nor-D-homo-4,13(17a)-androstadiene-11β-ol-3,17-dione is reacted with benzoyl chloride in pyridine in a manner similar to that described in Example 29A. The resultant product is isolated as described and crystallized from acetone-hexane to give 18 - nor-D-homo-4,13(17a)-androstadiene-11β-ol-3,17-dione 11-benzoate.

In a similar manner, by substituting o-toluyl chloride, m-toluyl chloride or p-toluyl chloride for benzoyl chloride in the above procedure there is obtained the corresponding 11-o-, m,- or p-toluate of 18-nor-D-homo-4,13-(17a)-androstadiene-11β-ol-3,17-dione.

C. *18 - nor - D-homo-4,13(17a)-androstadiene-11β-ol 3,17 - dione-11-methyl sulfonate.*—By substituting methanesulfonyl chloride for benzoyl chloride in the procedure of Example 29B 18-nor-D-homo-4,13(17a)-androstadiene-11β-ol-3,17-dione is converted to the corresponding 11-methanesulfonate ester.

In a similar manner, 18-nor-D-homo-4,13(17a)-androstadiene-11β-ol-3,17-dione is reacted with p-toluenesulfonyl chloride in pyridine to give 18-nor-D-homo-4,13-(17a)-androstadiene-11β-ol-3,17-dione 11-p-toluenesulfonate.

D. *18 - nor - D-homo-4,13(17a)-androstadiene-11β-ol-3,17-dione-11-hemisuccinate.*—To 1 gram of 18-nor-D-homo - 4,13(17a)-androstadiene-11β-ol-3,17-dione in 10 ml. of pyridine is added 1 gram of succinic anhydride. The mixture is heated on a steam bath for 1 hour then cooled and diluted with water. A solid separates which is filtered, washed with water, and dried to give 18-nor-D-homo - 4,13(17a) - androstadiene-11β-ol-3,17-dione 11-hemisuccinate.

Similarly, 3-methoxy-18-nor - D - homo - 1,3,5 (10),13 (17a)-estratetraene-18β-ol-17-one and 18-nor-D - homo-5,13(17a)-androstadiene-3β,11β-diol-17-one 3-acetate are reacted with succinic anhydride in pyridine in the above described manner to give respectively 3-methoxy-18-nor-D-homo-1,3,5(10),13(17a)-estratetraene-11β-ol - 17 - one 11-hemisuccinate and 18-nor-D-homo-5,13(17a)-androstadiene-3β,11β-diol-17-one 3-acetate 11-hemisuccinate.

E. Similarly, by utilizing the procedures of Examples 29A–D each of the 11β-hydroxy-18-nor-D-homo-androstanes and estranes, prepared as described in any of the preceding examples may be converted to their corresponding 11-carboxylic acid ester or 11-sulfonic acid ester respectively. It will be apparent to one skilled in the art that any other free hydroxyl groups present in the molecule will also be esterified as well as the 11-hydroxy group.

EXAMPLE 30

*Preparation of various mixed esters and hydrolysis thereof*

A. (1) 18-nor-D - homo - 5,13(17a) - androstadiene-3β,16α-triol-17-one 3,16-diacetate, prepared as described in Example 22B, is reacted with benzoyl chloride in pyridine in the manner described in Example 29B to give 18-nor-D - homo - 5,13(17a) - androstadiene-3β,11β,16α-triol-17-one 3,16-diacetate 11-benzoate.

(2) By substituting methanesulfonyl chloride for benzoyl chloride in the procedure described in the preceding paragraph there is obtained 18 - nor - D - homo-5,13(17a)-androstadiene 3β,11β,16α - triol - 17 - one 3,16-diacetate 11-methanesulfonate.

(3) To 1 gram of 18-nor-D-homo-5,13(17a)-androstadiene-3β,11β,16α-triol-17-one 3,16-diacetate 11 - benzoate in 30 ml. of methanol is added 300 mg. of sodium carbonate. The reaction mixture is stirred for 18 hours at room temperature then added to 100 ml. of water and neutralized with acetic acid. The aqueous mixture is filtered then extracted with methylene chloride. The methylene chloride extracts are combined and concentrated in vacuo to a residue containing 18-nor-D-homo-5,13(17a)-androstadiene-3β-11,16α-triol - 17 - one 11-benzoate.

In a similar manner the 11-methanesulfonate ester, prepared in Example 30A(2), is hydrolyzed with sodium carbonate in methanol to give 18-nor-D-homo-5,13(17a)-androstadiene-3β,11β,16α-triol-17 - one 11 - methanesulfonate.

(4) When an ester such as 18-nor-D-homo-5,13(17a)-androstadiene-3β,11β,16α-triol-17-one 3,16-diacetate 11-benzoate is reacted with perchloric acid in methanol according to the procedure described in Example 28A dehydration at C-11 occurs as well as hydrolysis of the ester and there is obtained 18-nor-D-homo - 5,11,13(17a)-androstatriene-3β,16α-diol-17-one.

In a similar manner 18-nor-D-homo-5,13(17a)-androstadiene-3β,11β,16α-triol-17-one 3,16-diacetate 11 - methanesulfonate upon reaction with perchloride acid in methanol yields 18-nor-D-homo-5,11,13(17a) - androstadiene-3β,16α-diol-17-one.

B. (1) 18-nor-D-homo - 1,3,5(10),(17a) - estratetraene-3,11β-diol-17-one 3-acetate (the compound of Example 8) is reacted with benzoyl chloride in pyridine in the manner of Example 29B to give 18-nor - D - homo-1,3,5(10),13(17a)-estratetraene-3,11β-diol - 17 - one 3-acetate 11-benzoate.

(2) 18-nor-D-homo - 1,3,5(10),13(17a)) - estratetraene-3,11β-diol-17-one 3-benzoate (the compound of Example 8B) is reacted with acetic anhydride in pyridine according to the procedure of Example 29A to give 18-nor-D-homo-1,3,5(10),13(17a)-estratetraene - 3,11β - diol-17-one 3-benzoate 11-acetate.

(3) Each of the above described mixed 3,11-diesters may be subjected to the action of a culture of *Flavobacterium dehydrogenans* and there will be obtained 18-nor - D - homo-1,3,5(10),13(17a) - estratetraene - 3,11β-diol - 17 - one 11 - benzoate and 18 - nor - D - homo-1,3,5(10),13(17a)-estratetraene-3,11β - diol-17 - one 3-benzoate respectively.

(4) Alternatively, when the 3-acetate 11-benzoate mixed diester, prepared as in Example B.1 is hydrolyzed with sodium carbonate in methanol according to the procedure described in Example 30(3) there is obtained 18-nor-D-homo - 1,3,5(10),13(17a) - estratetraene - 3,11β-diol-17-one 11-benzoate.

From the foregoing, it will be obvious to one skilled in the art that a great variety of esters may be prepared depending on the choice of reagents and sequence of reactions.

It is to be understood that this invention is not to be limited to the exact details of operation or exact compounds as shown and described herein as obvious modifications and equivalents will be apparent to one skilled in the art. The invention is to be limited only by the scope of the appended claims.

We claim:
1. A member selected from the group consisting of:
6-B-9α-X-16-V-17-keto-18-nor - D - homo - 13(17a)dehydro-4-androstene-3-one, the 19-nor-, Δ¹-, Δ⁶-, Δ¹-, ⁶-, Δ¹-4,5-dihydro- analogs thereof, and the 2-methyl and 7-methyl-homologs of the foregoing;
3β-(OW)-9α-X-16 - V - 17 - keto - 18 - nor - D - homo-13(17a)-dehydro-5-androstene;
3-(OR)-6-B-9α-X-16-V-17 - keto - 18 - nor - D - homo-13(17a)-dehydro-1,3,5(10)-estratriene;
and the tautomers of the foregoing;
wherein B is a member of the group consisting of hydrogen, α-lower alkyl, β-lower alkyl, α-fluoro and β-fluoro; X is a member of the group consisting of hydrogen and halogen; V is a member of the group consisting of hydrogen, α-lower alkyl, β-lower alkyl, α-halogen selected from the group consisting of fluorine, chlorine, and bromine, β-halogen selected from the group consisting of fluorine, chlorine, and bromine; and α-OY, wherein Y is a member of the group consisting of hydrogen and an acid radical of a hydrocarbon carboxylic acid having up to 8 carbon atoms selected from the group consisting of an alkanoic acid and an aryl carboxylic acid; R is a member of the group consisting of hydrogen, lower alkyl, and an acid radical of a hydrocarbon carboxylic acid having up to 8 carbon atoms selected from the group consisting of an alkanoic acid and an aryl carboxylic acid; W is a member of the group consisting of hydrogen and an acid radical of a hydrocarbon carboxylic acid having up to 8 carbon atoms selected from the group consisting of an alkanoic acid and an aryl carboxylic acid;
said member being characterized by a configuration about C-11 and C-12 of the group consisting of:

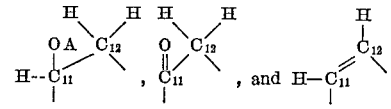

wherein A is a member selected from the group consisting of hydrogen and an acid radical of an acid selected from the group consisting of an aryl carboxylic acid having up to 8 carbon atoms, and a saturated aliphatic hydrocarbon carboxylic acid having up to eight carbon atoms."

2. 3 - OR - 18 - nor-D-homo-1,3,5(10), 13(17a)-estratetraene-11β-ol-17-one wherein R is an acyl radical of a hydrocarbon carboxylic acid having up to eight carbon atoms selected from the group consisting of alkanoic acids and aryl carboxylic acids.

3. 18 - nor - D - homo-4,13(17a)-androstadiene-11β-ol-3,17-dione 11-acetate.

4. 18 - nor - D - homo-1,4,13(17a)-androstatriene-11β-ol-3-,17-dione 11-acetate.

5. 18 - nor - D - homo - 1,3,5(10),13(17a)-estratetraene-3,11β-diol-17-one 3-acetate.

6. 9α - X - 18 - nor-D-homo-4,13(17a)-androstadiene-11β-ol-3,17-dione wherein X is a member selected from the group consisting of fluorine, chlorine, and bromine.

7. 9α - X - 18-nor-D-homo-1,4,13(17a)-androstatriene-

11β-ol-3,17-dione wherein X is a member selected from the group consisting of fluorine, chlorine, and bromine.

8. 3 - OR - 18 - nor - D-homo-1,3,5(10),13(17a)-estratetraene-11β-ol-17-one wherein R is lower alkyl.

9. 18 - nor - D - homo-4,13(17a)-androstadiene-11β-ol-3,17-dione.

10. 18 - nor - D - homo - 1,4,13(17a)-androstatriene-11β-ol-3,17-dione.

11. 16α - methyl - 18 - nor-D-homo-1,4,13(17a)-androstatriene-11β-ol-3,17-dione.

12. 18 - nor - D - homo - 5,13(17a)-androstadiene-3β,11β-diol-17-one.

13. 18 - nor - D - homo-1,4,6,13(17a)-androstatetraene-11-β-ol-3,17-dione.

14. 18,19 - bis - nor-D-homo-4,13(17a)-androstadiene-11β-ol-3,17-dione.

15. 18 nor - D-homo - 1,3,5(10),13(17a)-estratetraene-3-11β-diol-17-one.

16. In the process of preparing a compound selected from the group consisting of:

6-B - 9α - X-16-V-17-keto-18-nor-D-homo-13(17a)-dehydro-4-androstene-3-one, the 19-nor-, Δ¹-, Δ⁶-, Δ¹,⁶-, Δ¹-4,5-dihydro- analogs thereof, and the 2-methyl and 7-methyl-homologs of the foregoing;

3β - (OW) - 9α - X - 16 - V - 17 - keto-18-nor-D-homo-13(17a)-dehydro-5-androstene;

3 - (OR) - 6 -B - 9α - X - 16 - V - 17-keto-18-nor-D-homo-13(17a)-dehydro-1,3,5(10)-estratriene;

and the tautomers of the foregoing;

wherein B is a member of the group consisting of hydrogen, α-lower alkyl, β-lower alkyl, α-fluoro and β-fluoro; X is a member of the group consisting of hydrogen and halogen; V is a member of the group consisting of hydrogen, α-lower alkyl, β-lower alkyl, α-halogen having an atomic weight less than 126, β-halogen having an atomic weight less than 126, and α-OY, wherein Y is a member of the group consisting of hydrogen and an acid radical of a hydrocarbon carboxylic acid having up to 8 carbon atoms selected from the group consisting of an alkanoic acid and an arylcarboxylic acid; R is a member of the group consisting of hydrogen, lower alkyl, and an acid radical of a hydrocarbon carboxylic acid having up to 8 carbon atoms selected from the group consisting of an alkanoic acid and an arylcarboxylic acid; W is a member of the group consisting of hydrogen and an acid radical of a hydrocarbon carboxylic acid having up to 8 carbon atoms selected from the group consisting of an an alkanoic acid and an arylcarboxylic acid; said compound being characterized by a configuration about C-11 and C-12 of the group consisting of:

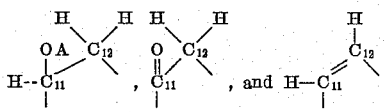

wherein A is a member selected from the group consisting of hydrogen and an acid radical of an acid selected from the group consisting of a methylsulfonic acid, p-toluene-sulfonic acid, an arylcarboxylic acid having up to 8 carbon atoms and a saturated, aliphatic hydrocarbon carboxylic acid having up to 8 carbon atoms;

the steps which comprise irradiating an 11-nitrite ester of a steroid selected from the group consisting of:

6 - B - 9α - X-16-V-4-androstene-11β-ol-3,17-dione, the 18-nor, Δ¹-, Δ⁶-, Δ¹,⁶-, Δ¹-4,5-dihydro- analogs thereof, and the 2-methyl- and 7-methyl homologs of the foregoing;

3β - (OW) - 9α - X - 16-V-5 androstene-11β-ol-17-one;

3 -(OR)- 6 -B - 9α - X-16-V-1,3,5(10)-estratriene-11β-ol-17-one;

wherein B, X, V, W, and R are as hereinedefined; in an inert solvent with ultraviolet radiation having a wave length greater than about 3000 A. and less than about 4400 A., said radiation including an absorption band of the 11-nitrite radical; and isolating the thereby formed 11β - hydroxy - 18-nor-D-homo-13(17a)-dehydro-steroid.

17. The process of claim 16 including the subsequent step of treating the thereby formed 11β-hydroxy-18-nor-D-homo-13(17a)-dehydro- steroid with chromic acid/sulfuric acid reagent whereby is formed the corresponding 11-keto-18-nor-D-homo-13(17a)-dehydro steroid.

18. The process of claim 16 including the subsequent step of treating the thereby formed 11β-hydroxy-18-nor-D - homo - 13(17a) - dehydro - steroid with a dehydrating agent selected from the group consisting of mineral acids and alkali metal hydroxides whereby is formed the corresponding 11 - dehydro - 18-nor-D-homo-13(17a)-dehydrosteroid.

References Cited by the Examiner
UNITED STATES PATENTS

| | | | |
|---|---|---|---|
| 2,707,190 | 4/55 | Farrar | 260—586 X |
| 2,822,381 | 2/58 | Dodson et al. | 260—456 X |
| 2,950,289 | 8/60 | Weisenborn | 260—456 X |
| 2,972,623 | 2/61 | Johns | 260—586 X |
| 3,024,271 | 3/62 | Amiard et al. | 260—586 |

FOREIGN PATENTS 1,208,589  9/59  France.

OTHER REFERENCES

Barton et al., J.A.C.S., vol. 82, pp. 2640–2643 (1960).
Fieser et al., "Steroids," page 224 (1959).
Johnson et al., J.A.C.S., vol. 78, pp. 6339–47 (1965).
Nazarov et al., C.A., vol. 53, pp. 22083–22084 (1959).
Nussbaum et al., J.A.C.S., vol. 83, pp. 2400–2401 (1961).
Wagner et al., "Synthetic Organic Chemistry," pp. 33–35 (1953).

CHARLES B. PARKER, *Primary Examiner.*

UNITED STATES PATENT OFFICE
CERTIFICATE OF CORRECTION

Patent No. 3,194,832                                        July 13, 1965

Hans Reimann et al.

It is hereby certified that error appears in the above numbered patent requiring correction and that the said Letters Patent should read as corrected below.

Column 42, line 10, for "the 18-nor," read -- the 19-nor, --.

Signed and sealed this 22nd day of February 1966.

(SEAL)
Attest:

ERNEST W. SWIDER                                EDWARD J. BRENNEI
Attesting Officer                                  Commissioner of Patents